(12) United States Patent
Yamao et al.

(10) Patent No.: US 6,351,498 B1
(45) Date of Patent: Feb. 26, 2002

(54) ROBUST DIGITAL MODULATION AND DEMODULATION SCHEME FOR RADIO COMMUNICATIONS INVOLVING FADING

(75) Inventors: Yasushi Yamao; Shogo Ito; Shinzo Ohkubo; Kobaruto Shimada; Fumiyuki Adachi, all of Kanagawa-ken (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/195,682

(22) Filed: Nov. 19, 1998

(30) Foreign Application Priority Data

Nov. 20, 1997 (JP) .............................................. 9-319939
Dec. 22, 1997 (JP) .............................................. 9-353262

(51) Int. Cl.[7] .............................................. H04L 27/28
(52) U.S. Cl. ...................... 375/260; 375/261; 375/298; 375/316; 370/335; 370/529
(58) Field of Search .............................. 375/260, 261, 375/130, 133, 134, 298, 316; 370/20, 335, 529

(56) References Cited

U.S. PATENT DOCUMENTS 5,640,423 A * 6/1997 Archer ........................ 375/261
5,734,647 A * 3/1998 Yoshida et al. .............. 370/335
6,141,387 A * 10/2000 Zhang .......................... 375/261
6,172,994 B1 * 1/2001 Schaffner et al. ........... 370/529

\* cited by examiner

*Primary Examiner*—Stephen Chin
*Assistant Examiner*—Shuwang Liu
(74) *Attorney, Agent, or Firm*—Oblon, Spivak, McClelland, Maier & Neustadt, P.C.

(57) ABSTRACT

A digital modulation and demodulation scheme for radio communications which is capable of reducing errors due to fading while maintaining the characteristic of the M-ary modulation and demodulation scheme that it is robust against interferences. At the transmitting side, transmission data are divided in advance into blocks of LN bits length each and each block is divided into N sets of L bits data sequences. Then, orthogonal codes of M bits length each corresponding to L bits codes given by the L bits data sequences are generated, and N sets of orthogonal codes for each block are multiplexed into a multiplexed signal, such that M bits constituting each orthogonal code are dispersed in time in the multiplexed signal. A digital modulation is then applied to a carrier using the multiplexed signal.

6 Claims, 24 Drawing Sheets

FIG.5
PRIOR ART

| MEMORY DATA | ORTHOGONAL CODE | OUTPUT SIGNAL |
|---|---|---|
| a1, a2 | GENERATOR # | b1, b2, b3, b4 |
| 1, 0 | 1 | 1, 1, 1, 1 |
| 1, 1 | 2 | 1, 0, 1, 0 |
| 0, 1 | 3 | 1, 1, 0, 0 |
| 0, 0 | 4 | 1, 0, 0, 1 |

FIG.6
PRIOR ART

| INPUT DATA (b1, b2) (b3, b4) | SYMBOL | TRANSMISSION FREQUENCY |
|---|---|---|
| 1, 0 | S1 | $\omega c + \omega 2$ |
| 1, 1 | S2 | $\omega c + \omega 1$ |
| 0, 1 | S3 | $\omega c - \omega 1$ |
| 0, 0 | S4 | $\omega c - \omega 2$ |

ROBUST DIGITAL MODULATION AND DEMODULATION SCHEME FOR RADIO COMMUNICATIONS INVOLVING FADING

BACKGROUND OF THE INVENTION

1. Field of the Invention

The present invention relates to a digital modulation and demodulation scheme for radio communications between a terminal and a base station such as those of the mobile communication, and more particularly, to a digital modulation and demodulation scheme for radio communications which is robust against variation of receiving signal strength due to fading and capable of reducing occurrences of errors.

2. Description of the Background Art

There are various known schemes for digital modulation and demodulation for radio communications between a terminal and a base station such as those of the mobile communication, and the M-ary modulation and demodulation scheme using orthogonal codes is one such scheme which is attracting much attentions recently.

FIG. 1 shows a configuration of a conventional M-ary modulation and demodulation system, which comprises an M-ary encoder 101, a PSK (Phase Shift Keying) modulator 102, a synchronous detector 103, and an M-ary decoder 104. Digital signals entered at a modulation input terminal are divided into blocks of L bits size each (where L is a natural number greater than 1) in advance such that each L bits data series can be regarded as an L bits code, and the M-ary encoder 101 generates orthogonal codes of $M=2^L$ bits length each which are uniquely defined with respect to respective codes. For example, in an exemplary case of L=2 shown in FIG. 2, M=4 so that 2 bits (a1, a2) of the entered data are converted into one of the 4 bits length orthogonal codes C1 to C4 according to a conversion rule shown in FIG. 2, and then outputted. The PSK modulator 102 applies the bi-phase shift keying (BPSK) to a carrier by using this orthogonal code. At the receiving side, a signal is detected by the synchronous detector 103, and the M-ary decoder 104 calculates cross-correlation value by multiplying the detected signal with each one of the four possible orthogonal codes C1 to C4, and determines the orthogonal code with the highest cross-correlation value as a received signal. In addition, the M-ary decoder 104 outputs 2 bits of the original data corresponding to the determined orthogonal code according to the conversion rule shown in FIG. 2.

As is well known, biorthogonal codes can be used instead of ordinary orthogonal codes, and $M=2^{L-1}$ ($L \geq 3$) in the case of using biorthogonal codes.

In the M-ary modulation and demodulation scheme, mutually orthogonal codes are used for different input data so that the cross-correlation between signals becomes zero, and therefore it has a characteristic of having a small interference in the identical channel. This characteristic makes it convenient as a modulation and demodulation scheme in the case of multiplexing a plurality of signals at the identical frequency as in the CDMA (Code Division Multiple Access) scheme.

However, in the mobile communication environment, in general, bursty errors occur due to thermal noise and abrupt carrier phase rotation that are caused by frequent dropping of receiving power due to fading. FIG. 3 shows a situation of an occurrence of an error due to fading in the example (L=2) shown in FIG. 2. In FIG. 3, when a time Tf of receiving power dropping due to fading extends over a plurality of bits, the orthogonal code that encountered this receiving power dropping due to fading (which appear shaded in FIG. 3) is difficult to detect using the correlation because of thermal noise, and therefore it has a higher probability of being decoded erroneously as another orthogonal code, and when such an erroneous decoding occurs, the bursty error of about L bits length will be caused.

Thus the conventional M-ary modulation and demodulation scheme has been associated with the problem that the bursty error is caused by the receiving power dropping due to fading.

Next, the operation of a decoder in the conventional modulation and demodulation system will be described in further detail.

FIG. 4 shows a configuration of a transmitting side of the conventional modulation and demodulation system. Here, it is assumed that orthogonal code generators 203-1 to 203-4 employ 4-ary orthogonal codes obtained from 4×4 Hadamard matrix, and therefore a shift register 202 stores data in 2 bits length. It is also assumed that a frequency modulator 205 employs the 4-valued frequency modulation (G=2, $2^G=4$).

In FIG. 4, the input data entered from an input terminal 201 is stored in the shift register 202. When the input data in a prescribed length of 2 bits (a1, a2) is stored in the shift register 202, a processor 204 reads lout these bits from the shift register 202, selects a corresponding one of the orthogonal code generators 203-1 to 203-4 according to a conversion rule shown in FIG. 5, and outputs a bit sequence outputted from the selected orthogonal code generator to the frequency modulator 205. Then, the frequency modulator 205 converts the entered 2 bits (b1, b2) or (b3, b4) into 4-valued symbols (S1, S2, S3, S4) because G=2, and outputs four frequencies ($\omega c \pm \omega 1$, $\omega c \pm \omega 2$, where $\omega c$ is the carrier frequency) corresponding to these four symbol values, which are transmitted from an antenna 205a. The relationship between the input bits, the 4-valued symbols and the transmission frequencies in this case is shown in FIG. 6.

FIG. 7 shows a configuration of a receiving side of the conventional modulation and demodulation system. The desired radio signals received at a reception unit 211 are entered into four band-pass filters 212-1 to 212-4 having the central frequencies ranging from $\omega c + \omega 2$ to $\omega c - \omega 2$. Each band-pass filter outputs only a signal having a frequency component in a prescribed bandwidth. The output signals of the band-pass filters are entered into corresponding envelope detectors 213-1 to 213-4, where voltage values or power values of the signals are obtained. Here, it is assumed that the voltage values are to be obtained, and the voltage values obtained in correspondence to the symbols (S1, S2, S3, S4) will be denoted as (e1, e2, e3, e4).

These voltage values are entered into a code judgement device 214, where the symbol with the largest voltage value among four voltage values entered therein is selected, and bits corresponding to the selected symbol are obtained according to a correspondence table shown in FIG. 6. The obtained bits are then multiplied with output bits of orthogonal code generators 223-1 to 223-4 at multiplexers 224-1 to 224-4 and entered into integrators 215-1 to 215-4. These integrators integrate the entered values over a transmission time required for 2 bits that are stored into the shift register at the transmitting side, and enters the obtained values into a decoding unit 216. This decoding unit 216 selects one input with the largest value among the four inputs, obtains 2 bits corresponding to one of the orthogonal code generators 223-1 to 223-4 that is used in multiplication of that input, and outputs these bits at an output terminal 217.

In this conventional decoder, there is a problem in that the code judgement device 214 converts the entered values into bit sequences once so that the output signals of the envelope detectors 213-1 to 213-4 cannot be directly utilized at the decoder 216 and consequently not much coding gain can be obtained.

SUMMARY OF THE INVENTION

It is therefore an object of the present invention to provide a digital modulation and demodulation scheme for radio communications which is capable of reducing errors due to fading while maintaining the characteristic of the M-ary modulation and demodulation scheme that it is robust against interferences.

It is another object of the present invention to provide a decoder for decoding orthogonal codes which is capable of realizing high quality signal transmission in the mobile communication that involves fading and which is therefore suitable for use in the digital modulation and demodulation scheme of the present invention.

According to one aspect of the present invention there is provided a digital modulation and demodulation system for radio communications, comprising: a transmitting side device having: a division unit for dividing transmission data in advance, into blocks of LN bits length each, where L and N are natural number greater than one, and dividing each block into N sets of L bits data sequences; an encoding unit for generating orthogonal codes of M bits length each, where M is a natural number, which are uniquely defined with respect to L bits codes given by the L bits data sequences obtained by the division unit; a multiplexing unit for multiplexing N sets of orthogonal codes generated by the encoding unit for each block into a multiplexed signal, such that M bits constituting each orthogonal code are dispersed in time in the multiplexed signal; and a modulation unit for applying a digital modulation to a carrier using the multiplexed signal obtained by the-multiplexing unit; and a receiving side device having: a detection unit for obtaining a detection output of signals received from the transmitting side, a separation unit for setting the detection output obtained by the detection unit into reception data-units of NM bits length each in synchronization with multiplexing applied at the transmitting side, and separating each reception data-unit into N sets of M bits sequences; a decoder for obtaining a correlation between each M bits sequence obtained by the separation unit and every possible orthogonal code defined at the transmitting side device, selecting one orthogonal code with a highest correlation, and outputting an L bits data sequence corresponding to each selected orthogonal code; and a composition unit for recovering an original LN bits signal by applying an inverse operation of an operation applied at the transmitting side device, with respect to N sets of L bits data sequences outputted by the decoder for each reception data-unit.

According to another aspect of the present invention there is provided a method of digital modulation and demodulation for radio communications, comprising the steps of: (a) dividing transmission data in advance, into blocks of LN bits length each, where L and N are natural number greater than one, and dividing each block into N sets of L bits data sequences, at a transmitting side; (b) generating orthogonal codes of M bits length each, where M is a natural number, which are uniquely defined with respect to L bits codes given by the L bits data sequences obtained by the step (a), at the transmitting side; (c) multiplexing N sets of orthogonal codes generated by the step (b) for each block into a multiplexed signal, such that M bits constituting each orthogonal code are dispersed in time in the multiplexed signal, at the transmitting side; (d) applying a digital modulation to a carrier using the multiplexed signal obtained by the step (c), at the transmitting side; (e) obtaining a detection output of signals received from the transmitting side, at a receiving side; (f) setting the detection output obtained by the step (e) into reception data-units of NM bits length each in synchronization with multiplexing applied at the transmitting side, and separating each reception data-unit into N sets of M bits sequences, at the receiving side; (g) obtaining a correlation between each M bits sequence obtained by the step (f) and every possible orthogonal code defined at the transmitting side, selecting one orthogonal code with a highest correlation, and outputting an L bits data sequence corresponding to each selected orthogonal code, at the receiving side; and (h) recovering an original LN bits signal by applying an inverse operation of an operation applied at the transmitting side, with respect to N sets of L bits data sequences outputted by the step (g) for each reception data-unit, at the receiving side.

Other features and advantages of the present invention will become apparent from the following description taken in conjunction with the accompanying drawings.

BRIEF DESCRIPTION OF THE DRAWINGS

FIG. 5 is a diagram showing an exemplary conversion rule used in the conventional modulation and demodulation system of FIG. 4.

FIG. 6 is a diagram showing an exemplary relationship between inputs bits, 4-valued symbols and transmission frequencies used in the conventional modulation and demodulation system of FIG. 4.

DETAILED DESCRIPTION OF THE PREFERRED EMBODIMENTS

Figure 8:
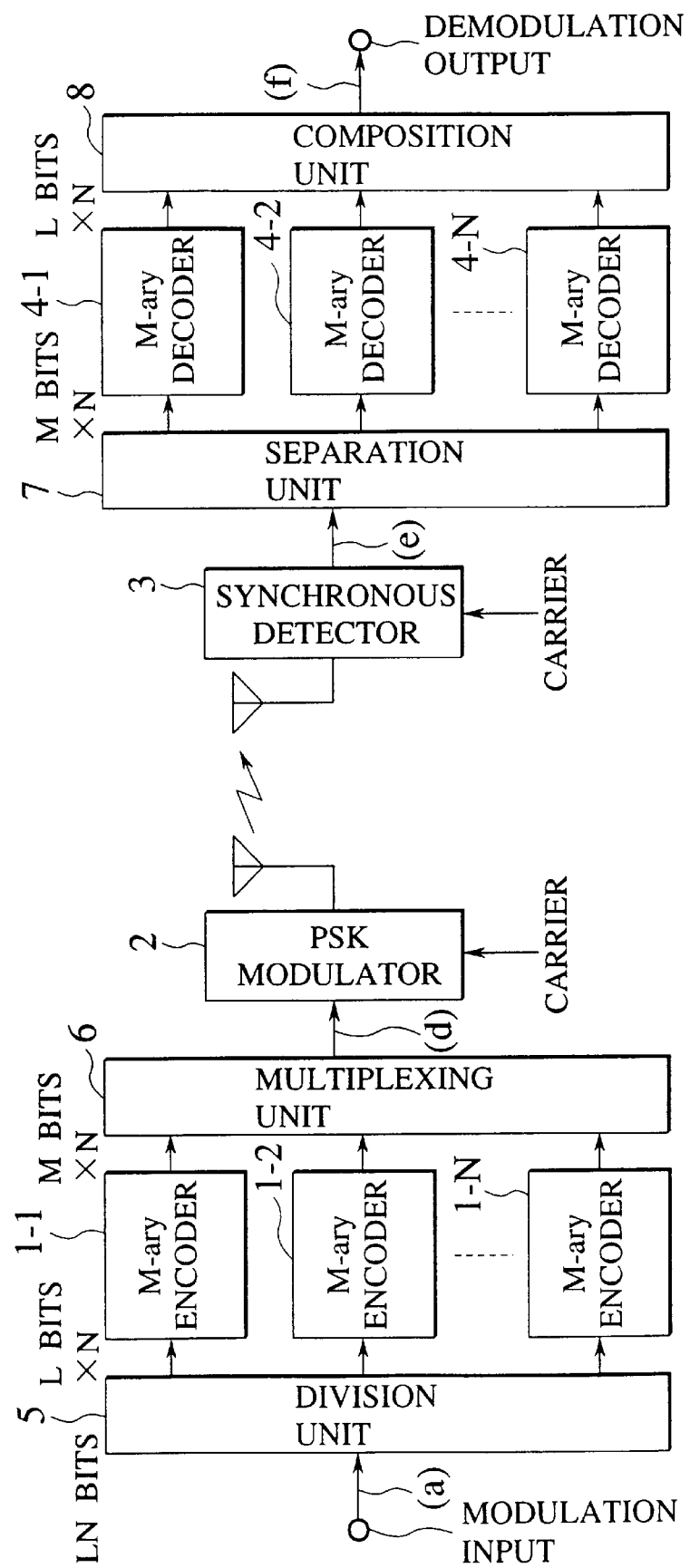
FIG. 8 is a block diagram showing a configuration of a digital modulation and demodulation system according to the first embodiment of the present invention.
Figure 9:
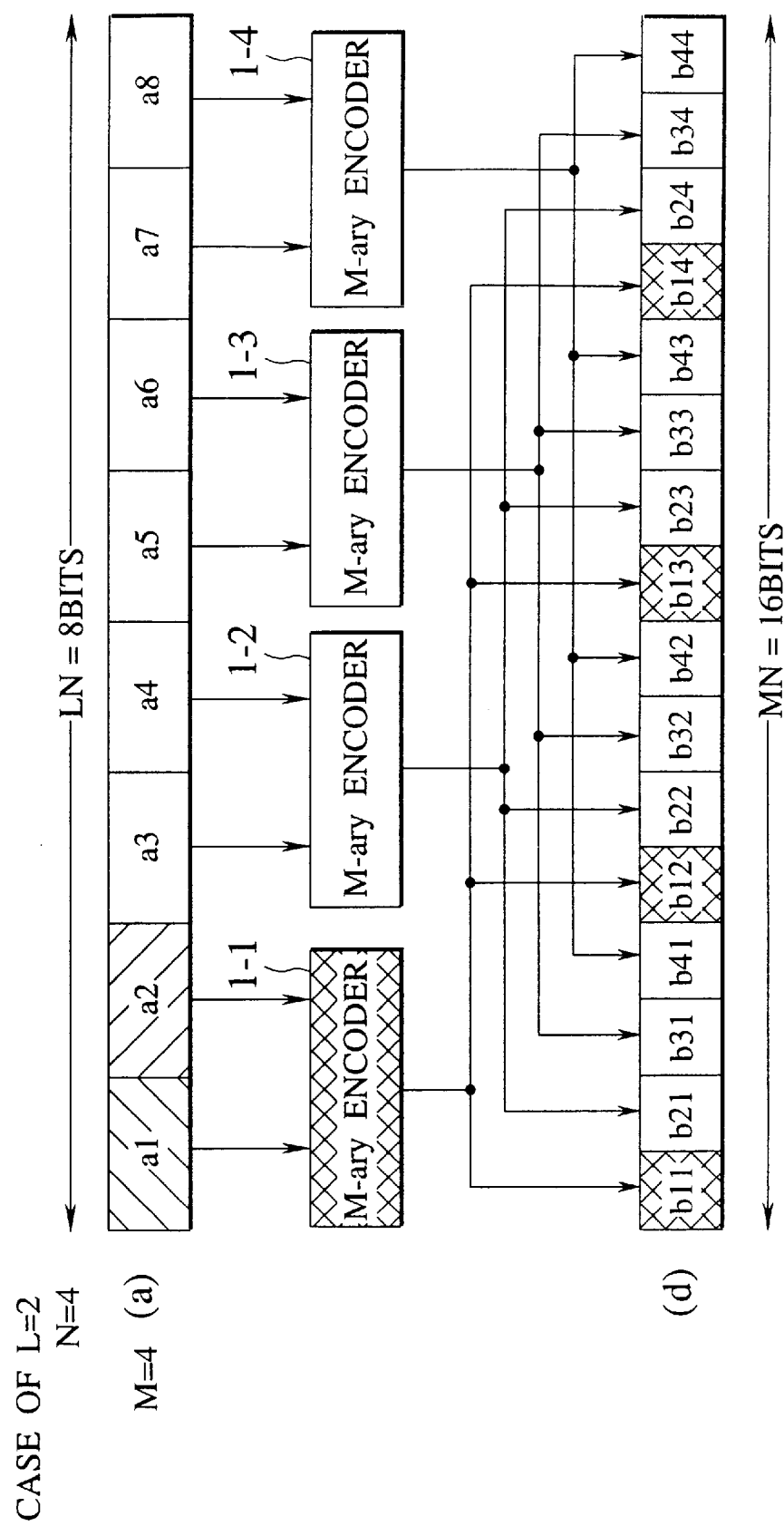
FIG. 9 is a diagram showing an exemplary signal processing at the transmitting side of the digital modulation and demodulation system of FIG. 8.
Figure 10:
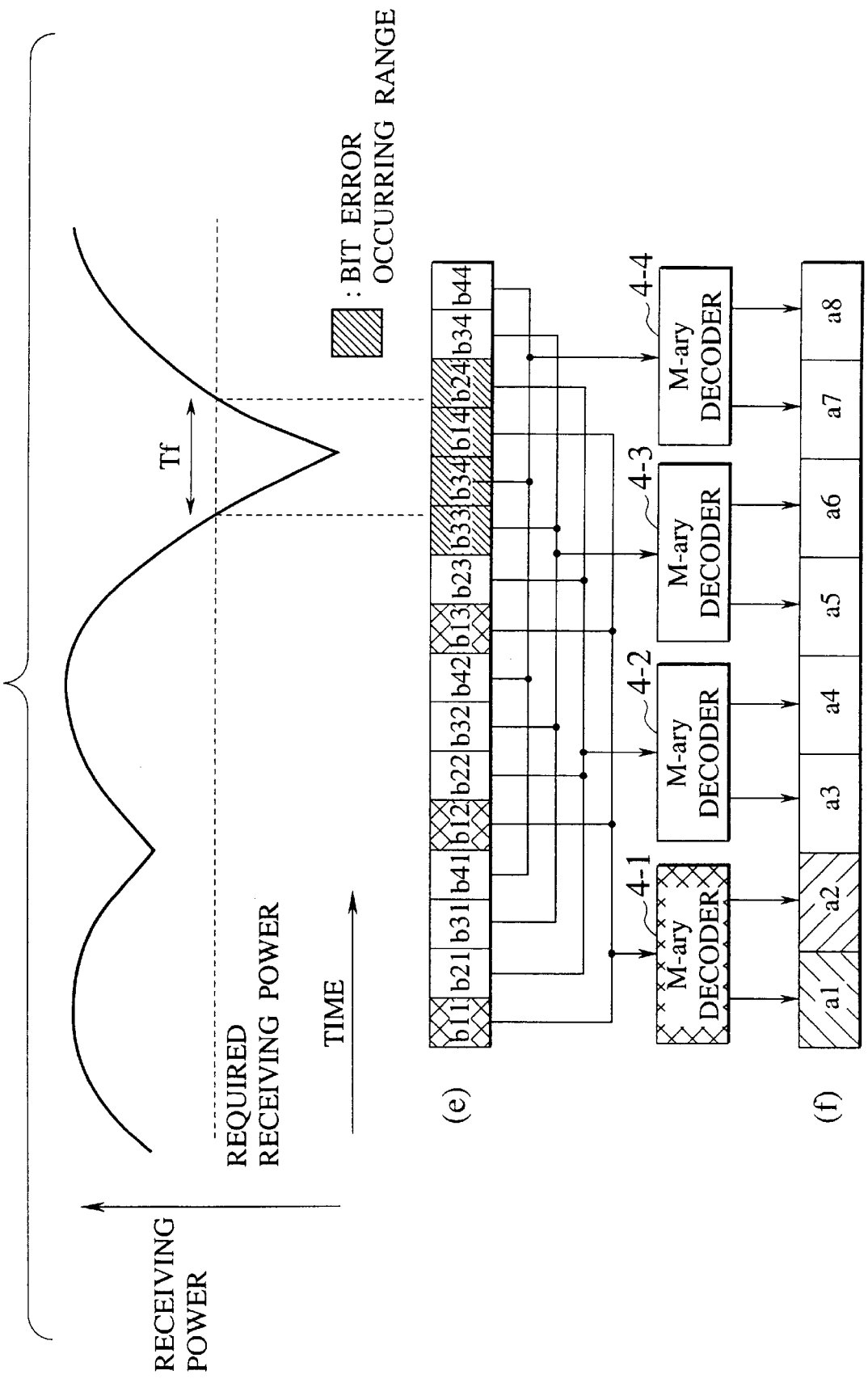
FIG. 10 is a diagram showing an exemplary signal processing at the receiving side of the digital modulation and demodulation system of FIG. 8.

Referring now to FIG. 8 to FIG. 10, the first embodiment of a digital modulation and demodulation scheme for radio communications according to the present invention will be described in detail.

FIG. 8 shows a configuration of a digital modulation and demodulation system in this first embodiment, in which a transmitting side comprises a division unit 5 for dividing LN bits data to be transmitted into N sets of L bits data sequences, N sets of M-ary encoders 1-1 to 1-N, a multiplexing unit 6 for multiplexing N sets of orthogonal codes, and a PSK modulator 2, while a receiving side comprises a synchronous detector 3, a separation unit 7 for separating detected signals into N-sets of M bits sequences, N sets of M-ary decoders 4-1 to 4-N, and a composition unit 8 for recovering the original LN bits data by applying an inverse operation of what was applied at the transmitting side with respect to N sets of L bits data sequences.

In FIG. 8, digital signals entered at a modulation input terminal are divided into blocks of LN bits size each (where L and N are natural numbers greater than 1) at the division unit 5, and each block is further divided into N sets of L bits data sequence and entered into respective ones of the M-ary encoders 1-1 to 1-N.

Figure 1:
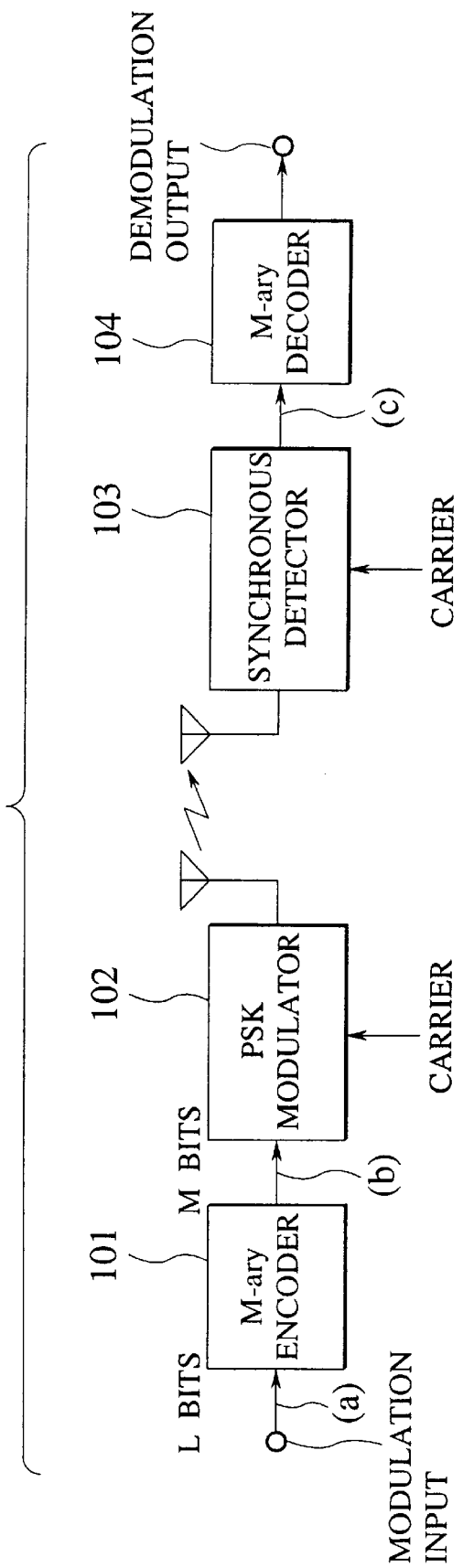
FIG. 1 is a block diagram showing an exemplary configuration of a conventional M-ary modulation and demodulation system.
Figure 2:
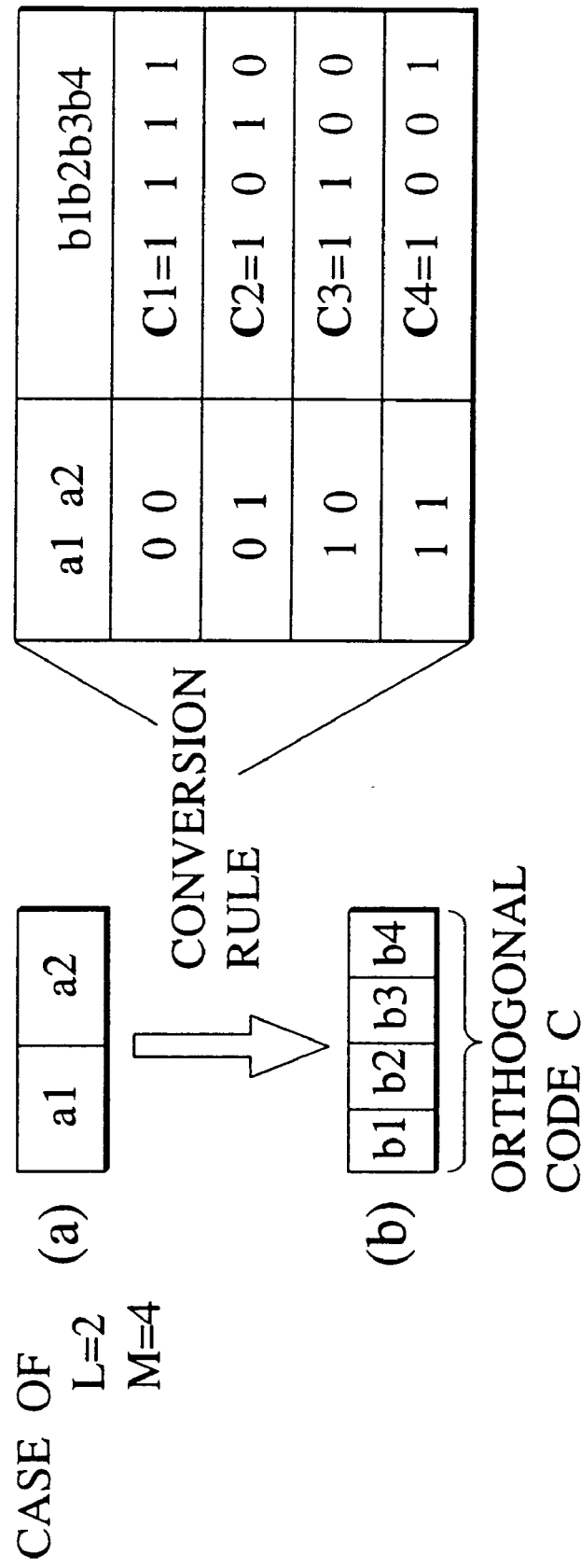
FIG. 2 is a diagram showing an exemplary conversion rule used in the conventional M-ary modulation and demodulation system of FIG. 1.

At the M-ary encoders 1-1 to 1-N, M-ary orthogonal codes corresponding to the respective inputs are generated similarly as in the conventional case. For example, when the ordinary orthogonal codes with L=2 are used, the 2 bits data (a1, a2) entered into the M-ary encoder 1-k ($1 \leq k \leq N$) is converted into one of the 4 bits length orthogonal codes C1 to C4 according to a conversion rule shown in FIG. 2 described above, and then outputted. Here, as already mentioned above, biorthogonal codes can be used instead of ordinary orthogonal codes, and $M=2^{L-1}$ ($L \geq 3$) in the case of using biorthogonal codes. N sets of orthogonal codes so obtained are then multiplexed at the multiplexing unit 6, and the output of the multiplexing unit 6 is entered into the PSK modulator 2 and used in phase modulating a carrier therein.

FIG. 9 shows an exemplary signal processing up to the input of the PSK modulator 2 in FIG. 8. This FIG. 9 is directed to an exemplary case of L=2, N=4 and M=4. At the division unit 5, the input signal (a) (at a point;(a) indicated in FIG. 8) is divided into blocks of 8 bits size each, and each set of 8 bits is further divided into 4 sequences of 2 bits each and entered into the M-ary encoders 1-1 to 1-4. Here, the method for dividing each set of 8 bits into 4 sequences is arbitrary, and FIG. 9 depicts an exemplary case of forming a sequence from each 2 bits in the input order. The multiplexing unit 6 multiplexes signals outputted from the four M-ary encoders in bit units. Namely, 4 bits of the orthogonal code outputted from the M-ary encoder 1-1 are arranged at four hatched locations (b11, b12, b13, b14) in a demodulator input (d) (at a point (d) indicated in FIG. 8), while 4 bits of the orthogonal code outputted from the M-ary encoder 1-2 are arranged at four locations (b21, b22, b23, b24) which are displaced from (b11, b12, b13, b14) by one bit each, and so on.

On the other hand, at the receiving side, the signals are detected at the synchronous detector 3, and the detected signals are entered into the separation unit 7 where the detected signals are set into reception data-units of NM bits length each in synchronization with the multiplexing at the transmitting side. The separation unit 2 further separates each reception data-unit into N sets of M bits sequences and outputs them respectively to the M-ary decoders 4-1 to 4-N.

At each of the M-ary decoders 4-1 to 4-N, the cross-correlation values are calculated by multiplying the entered detected signal with each one of the possible orthogonal codes, and the orthogonal code with the highest correlation value is Judged as a received signal. In addition, at each M-ary decoder, the original L bits data corresponding to the orthogonal code that is judged as a received signal is obtained according to the same conversion rule as used at the transmitting side and outputted. The composition unit 8 then recovers the original LN bits data by applying the inverse operation of what was applied at the transmitting side with respect to N sets of L bits data sequence outputted from all the M-ary decoders.

FIG. 10 shows an exemplary signal processing subsequent to the output of the synchronous detector 3 in FIG. 8, which is in correspondence to FIG. 9. The four times multiplexed detector output (e) (at a point (e) indicated in FIG. 8) is separated into four data sequences by the separation unit 7 using the inverse operation of what was applied by the multiplexing unit 6 at the transmitting side. The separated four data sequences are then respectively entered into the M-ary decoders 4-1 to 4-4. At each of the M-ary decoders 4-1 to 4-4, the orthogonal code with the highest correlation value with respect to the input is judged as a received signal, and the original 2 bits data corresponding to this orthogonal code that is judged as a received signal are obtained according to the same conversion rule of FIG. 2 as used at the transmitting side and then outputted. The four sequences of 2 bits data outputted from the M-ary decoders 4-1 to 4-4 are then recomposed into the original 8 bits data (f) (at a point (f) indicated in FIG. 8) by the composition unit 8 using the inverse operation of what was applied at the transmitting side.

Figure 3:
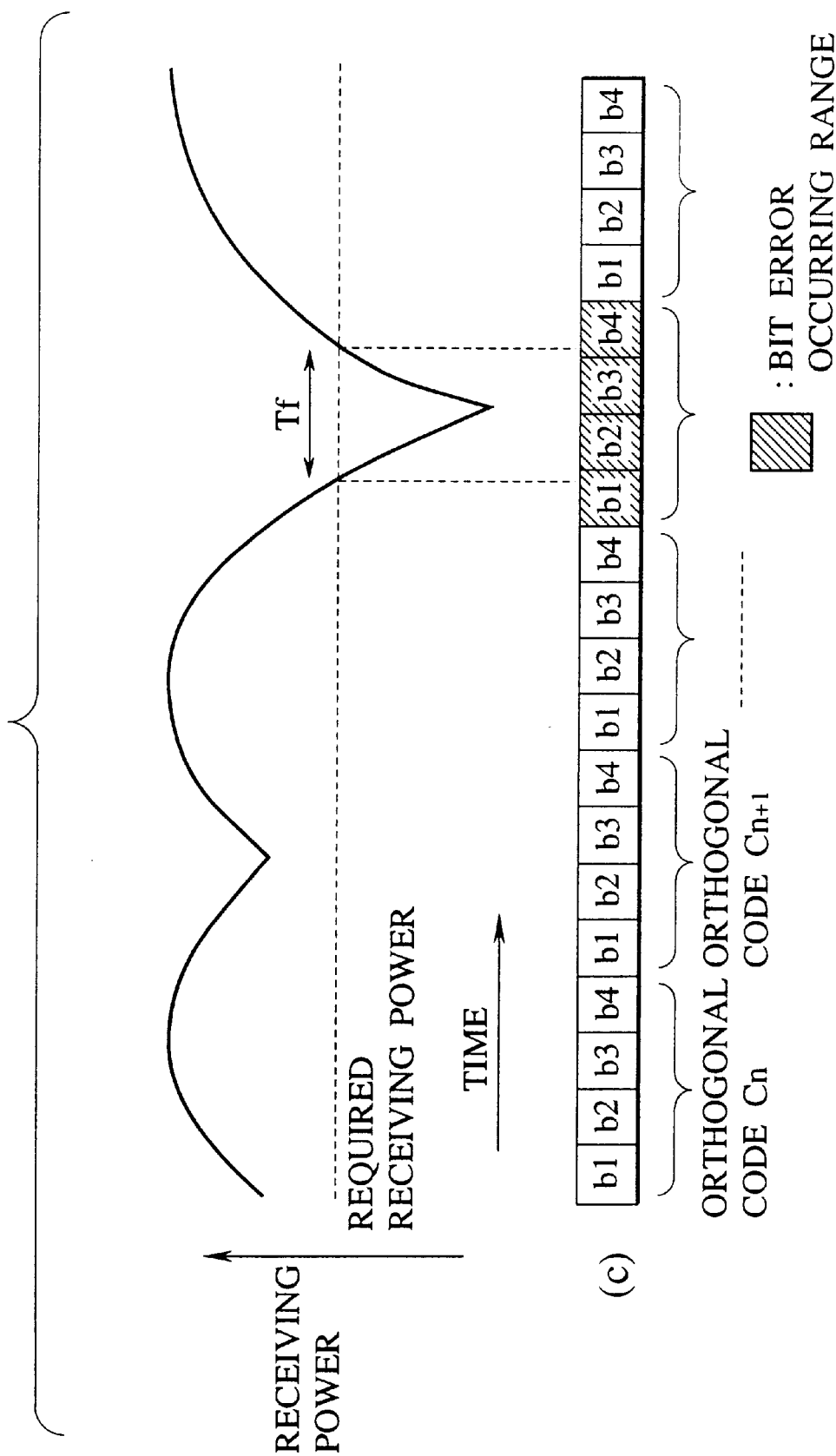
FIG. 3 is a diagram showing an exemplary situation of an occurrence of an error due to fading in the conventional M-ary modulation and demodulation system of FIG. 1.
Figure 4:
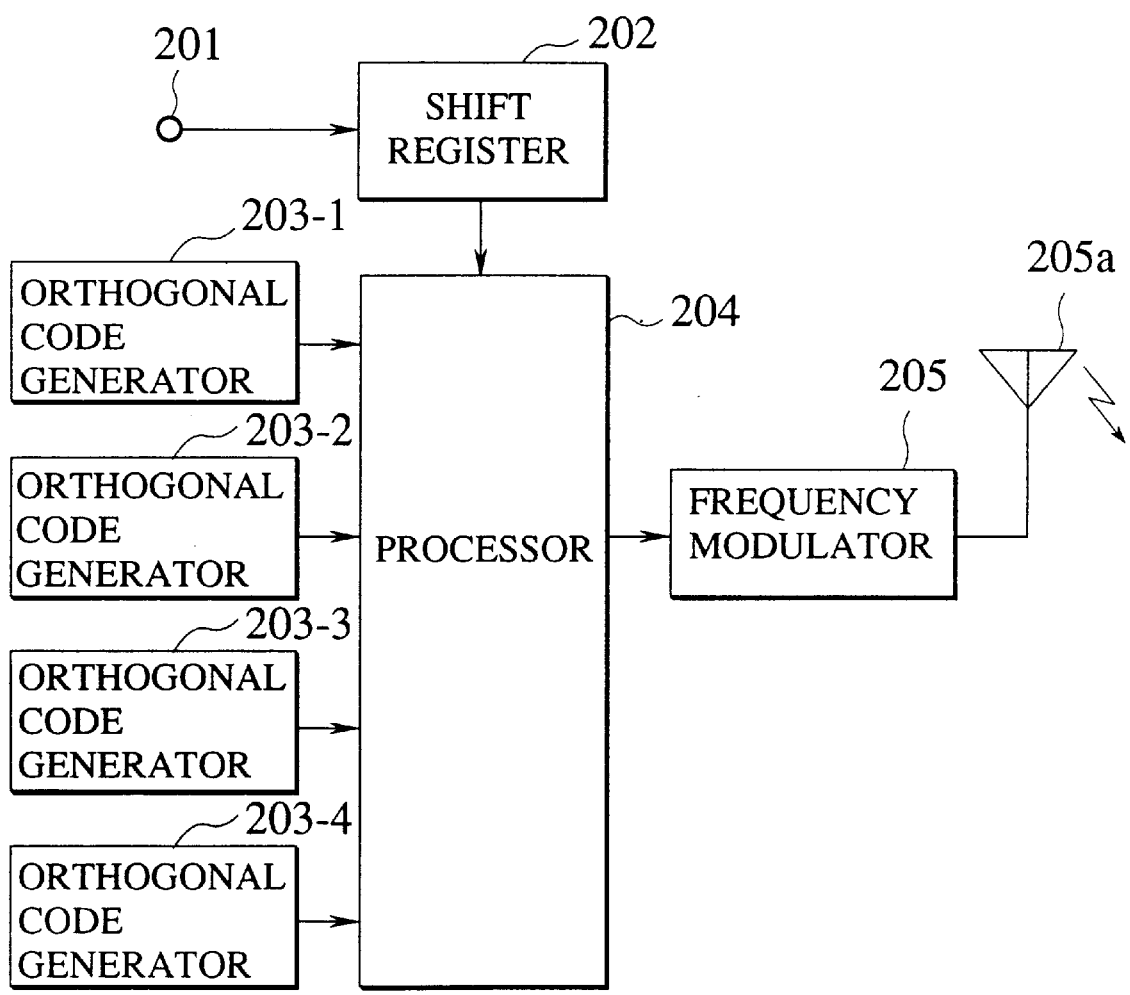
FIG. 4 is a block diagram showing an exemplary configuration of a transmitting side of the conventional modulation and demodulation system.
Figure 7:
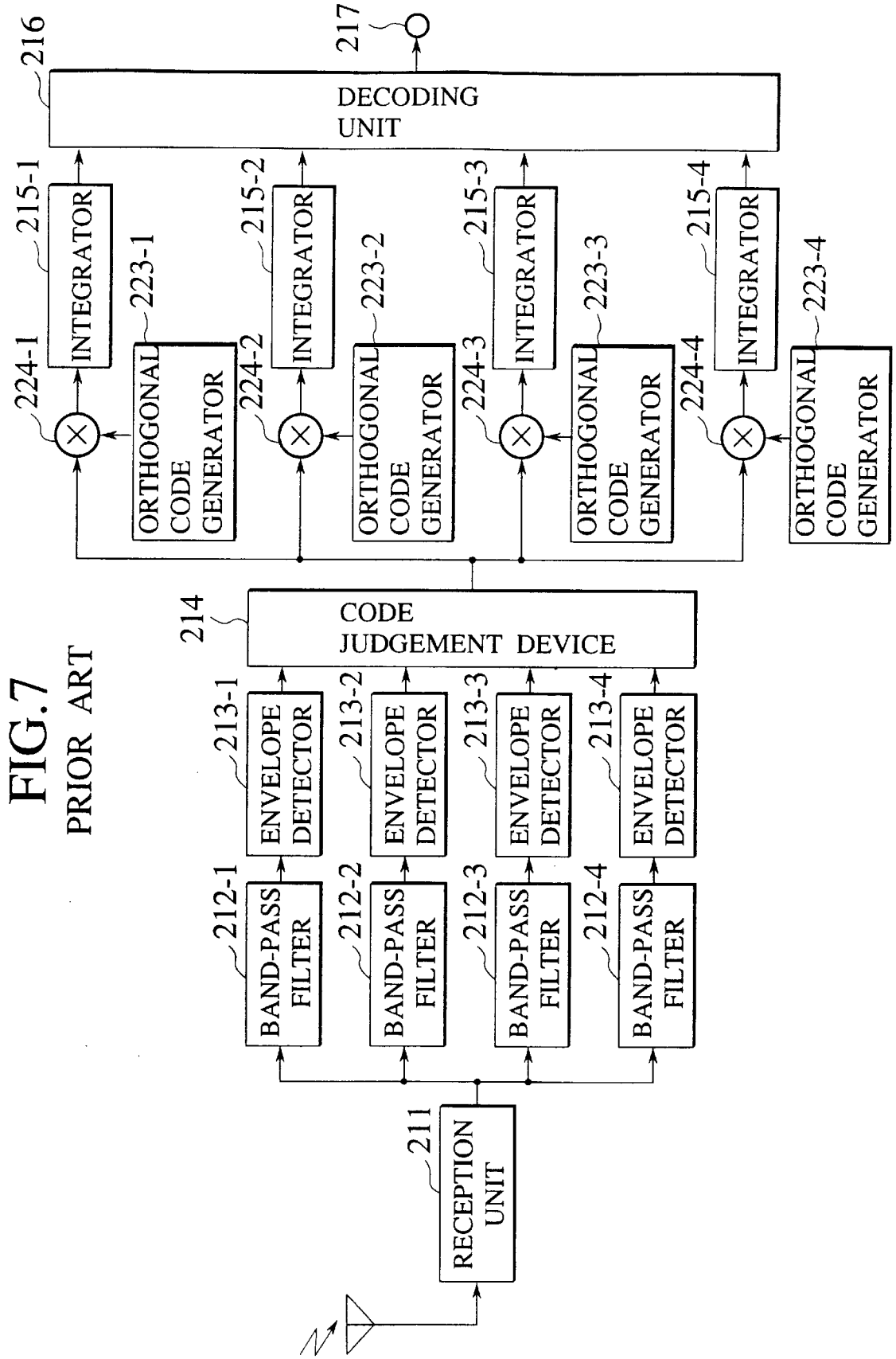
FIG. 7 is a block diagram showing an exemplary configuration of a receiving side of the conventional modulation and demodulation system.

Next, the reason why it is hard to cause errors by the receiving power dropping due to fading in this embodiment will be described. In FIG. 9, the 4 bits orthogonal code corresponding to the input data bit a1 (or a2) at a shaded location in the input signal (a) is arranged at locations b11 to b14 which are dispersed in time in the modulator input (d). Consequently, only one bit at b14 falls within the receiving power dropping time Tf due to fading shown in FIG. 10 (which is assumed to be identical to Tf shown in FIG. 3). As a result, the probability for being erroneously judged as another orthogonal code at a time of the correlation detection is low. In contrast, in the conventional case shown in FIG. 3, 4 bits of one orthogonal code are arranged consecutively so that plural bits (4 bits in the case shown in FIG. 3) fall within the receiving power dropping time due to fading and therefore the probability for being erroneously judged as another orthogonal code is high.

Note that FIG. 8 shows an exemplary case of using the PSK synchronous detection as the modulation and demodulation method. However, under the fading environment, not just the receiving power dropping but also an abrupt carrier phase rotation will occur so that there are cases where many errors are caused and the satisfactory characteristic cannot be obtained because the PSK synchronous detection cannot follow the abrupt carrier phase rotation. In such cases, it is possible to obtain the better characteristic by using the FSK (Frequency Shift Keying) energy detection rather than the PSK synchronous detection. In the case of using the FSK energy detection, the same effects of the present invention as described above can also be achieved by using an FSK modulator instead of the PSK modulator 2 and an FSK energy detector instead of the synchronous detector 3 in the configuration of FIG. 8.

Referring now to FIG. 11 to FIG. 14, the second embodiment of a digital modulation and demodulation scheme for radio communications according to the present invention will be described in detail. This second embodiment is directed to the case of using multi-valued modulation method.

Figure 11:
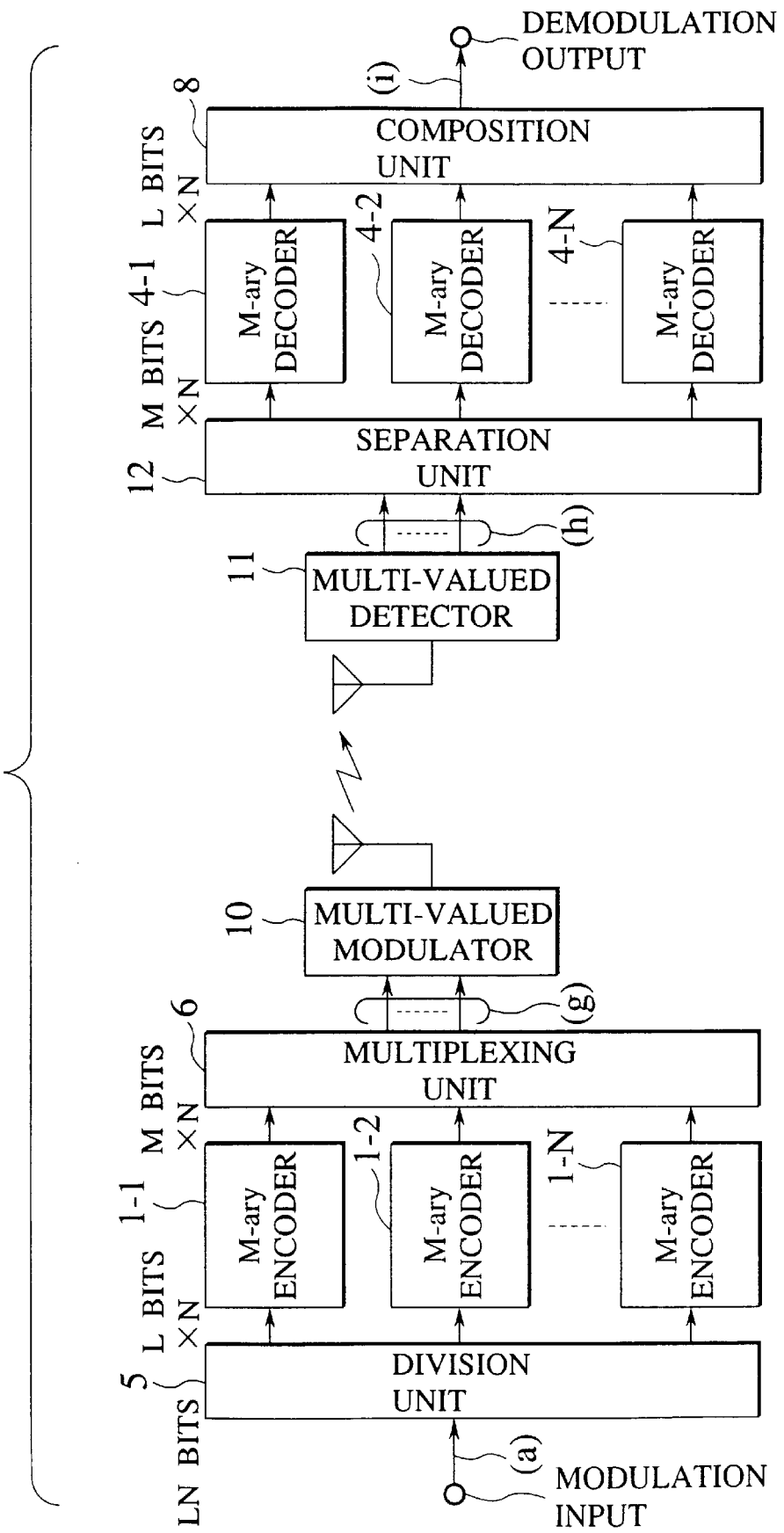
FIG. 11 is a block diagram showing a configuration of a digital modulation and demodulation system according to the second embodiment of the present invention.

FIG. 11 shows a configuration of a digital modulation and demodulation system in this second embodiment, where the division unit 5 and the M-ary modulators 1-1 to 1-N on the transmitting side and the M-ary decoders 4-1 to 4-N and the composition unit 8 on the receiving side are substantially similar to those of the first embodiment, while a multiplexing unit 9 and a separation unit 12 are adapted to handle multi-valued modulation, and a multi-valued modulator 10 and a multi-valued detector 11 are provided in places of the PSK modulator 2 and the synchronous detector 3 of FIG. 8. In the following, the operation in the second embodiment will be described mainly for a section from the multiplexing unit 9 to the separation unit 12 which differs from the first embodiment.

In FIG. 11, the operation and the signal state at each component in a section from the modulation input terminal to the input of the multiplexing unit 9 are the same as in the case of FIG. 8. The multiplexing unit 9 multiplexes N sets of orthogonal codes and outputs signal sequences in number corresponding to the multi-valued number. The output of the multiplexing unit 9 is entered into the multi-valued modulator 10 and used in multi-valued modulating a carrier therein.

Figure 12:
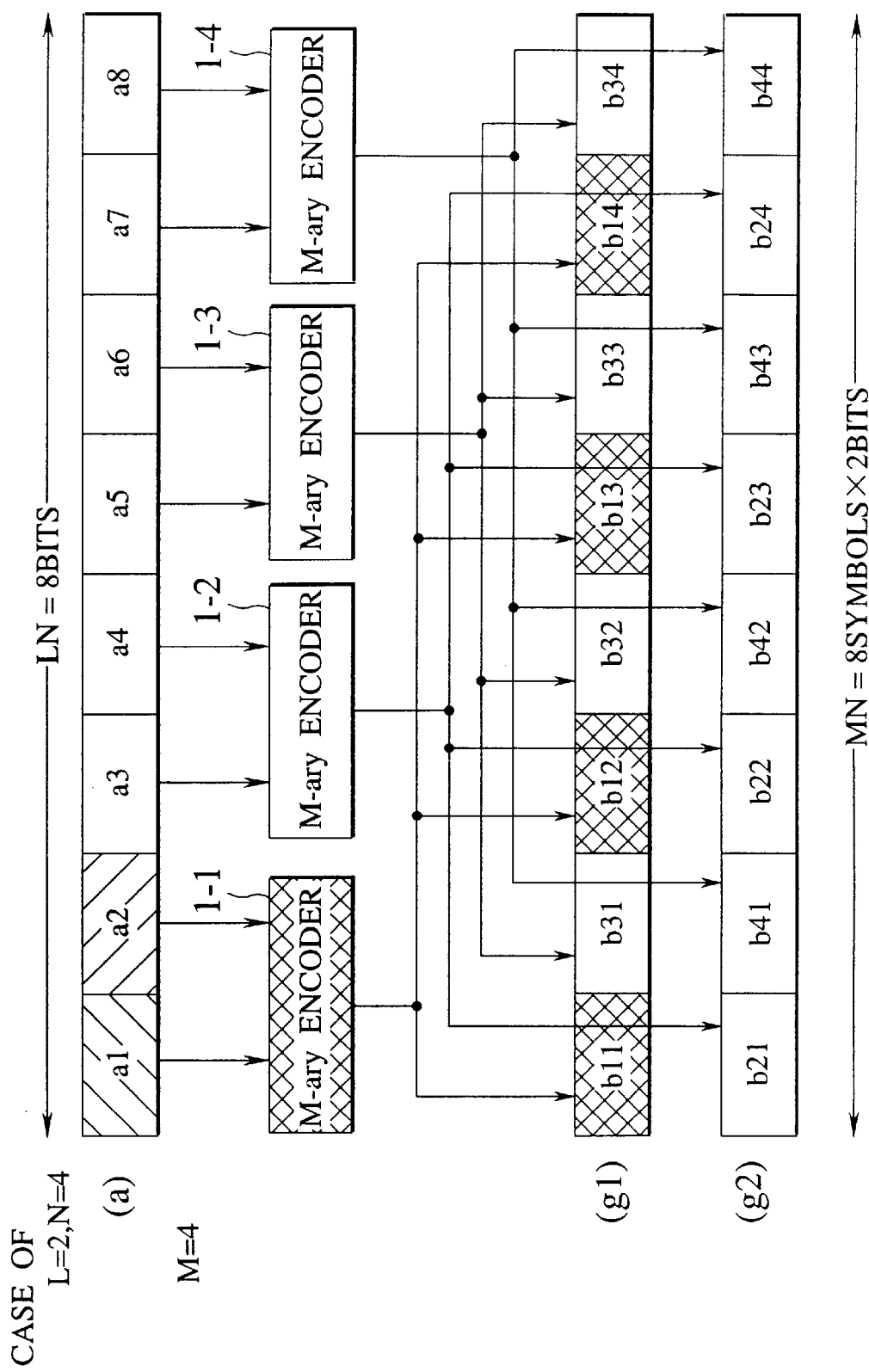
FIG. 12 is a diagram showing an exemplary signal processing at the transmitting side of the digital modulation and demodulation system of FIG. 11.

FIG. 12 shows an exemplary signal processing up to the input of the multi-valued modulator 10 in FIG. 11. This FIG. 11 is directed to an exemplary case of L=2, N=4 and M=4 similarly as FIG. 9. At the division unit 5, the input signal (a) (at a point (a) indicated in FIG. 11) is divided into blocks of 8 bits size each, and each set of 8 bits is further divided into 4 sequences of 2 bits each and entered into the M-ary encoders 1-1 to 1-4. The multiplexing unit 9 multiplexes signals outputted from the four M-ary encoders in bit units. In this example, signals from the M-ary encoders 1-1 and 1-3 are multiplexed into a sequence (g1) while signals from the M-ary encoders 1-2 and 1-4 are multiplexed into a sequence (g2) (at a point (g) indicated in FIG. 11). Namely, 4 bits of the orthogonal code outputted from the M-ary encoder 1-1 are arranged at four hatched locations (b11, b12, b13, b14) in the sequence (g1), while 4 bits of the orthogonal code outputted from the M-ary encoder 1-2 are arranged at four locations (b21, b22, b23, b24) in the sequence (g2), and so on. The 4-valued modulation can be carried out by regarding 2 bits at the same timing in the sequences (g1) and (g2) as one symbol.

Figure 13:
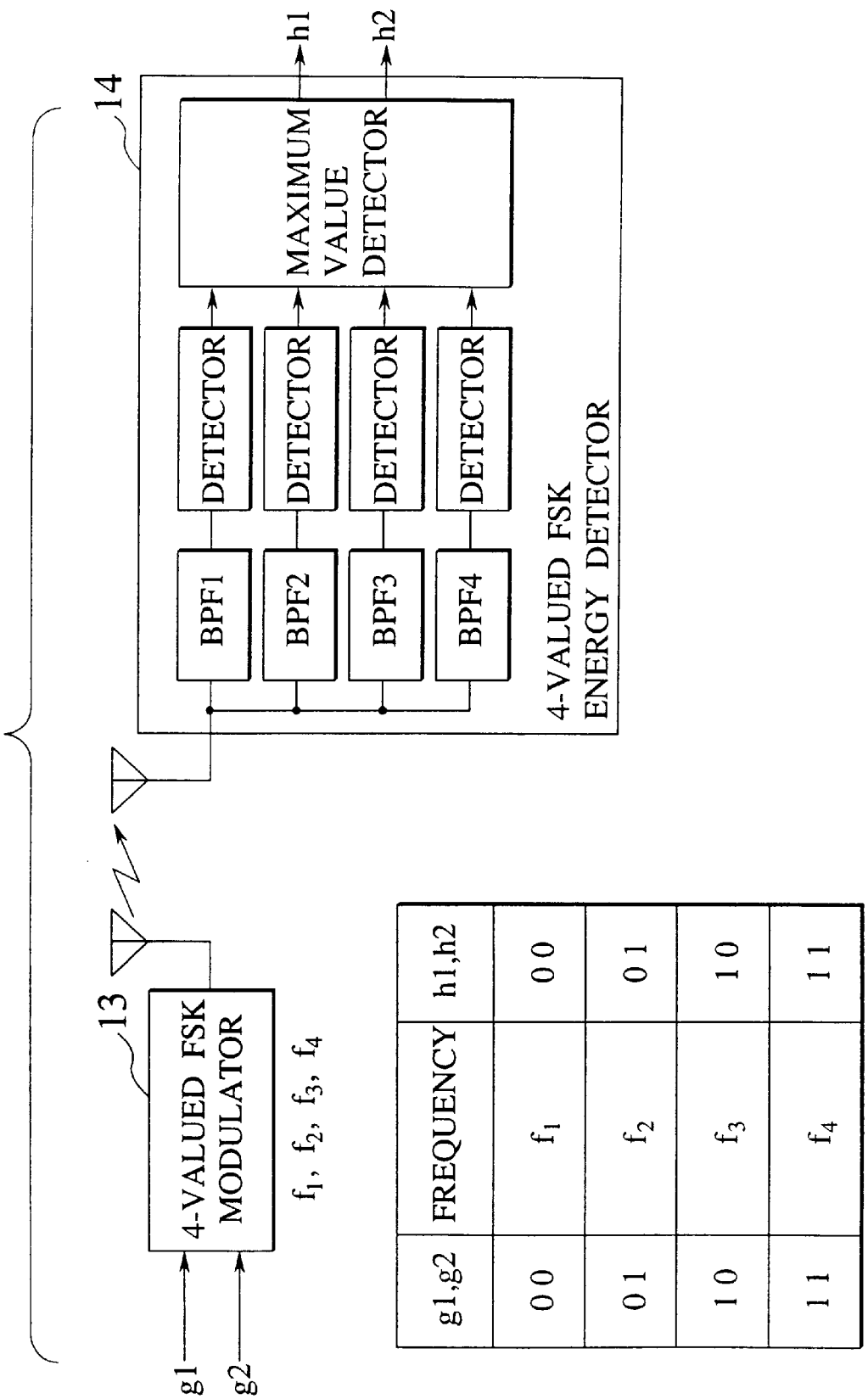
FIG. 13 is a block diagram showing an exemplary configuration of a 4-valued FSK modulator and a 4-valued FSK energy detector that can be used in the digital modulation and demodulation system of FIG. 11.

As an example of the multi-valued modulation, FIG. 13 shows a configuration of a 4-valued FSK modulator 13 and a 4-valued FSK energy detector 14 in the case of using 4-valued FSK energy detection. At the 4-valued FSK modulator 13, two modulator inputs g1 and g2 are entered, and frequencies corresponding to the values of g1 and g2 as indicated in a table shown below the 4-valued FSK modulator 13 are outputted. At the 4-valued FSK energy detector 14, after the received signals are filtered through band-pass filters BPF1 to BPF4 having central frequencies f1, f2, f3 and f4 respectively, four detector outputs are obtained, and then 2 bits corresponding to a frequency for which the largest detector output is obtained are outputted as h1 and h2 (at a point (h) indicated in FIG. 11).

The signals hi outputted from the multi-valued detector 11 in this manner are then entered into the separation unit 12.

Figure 14:
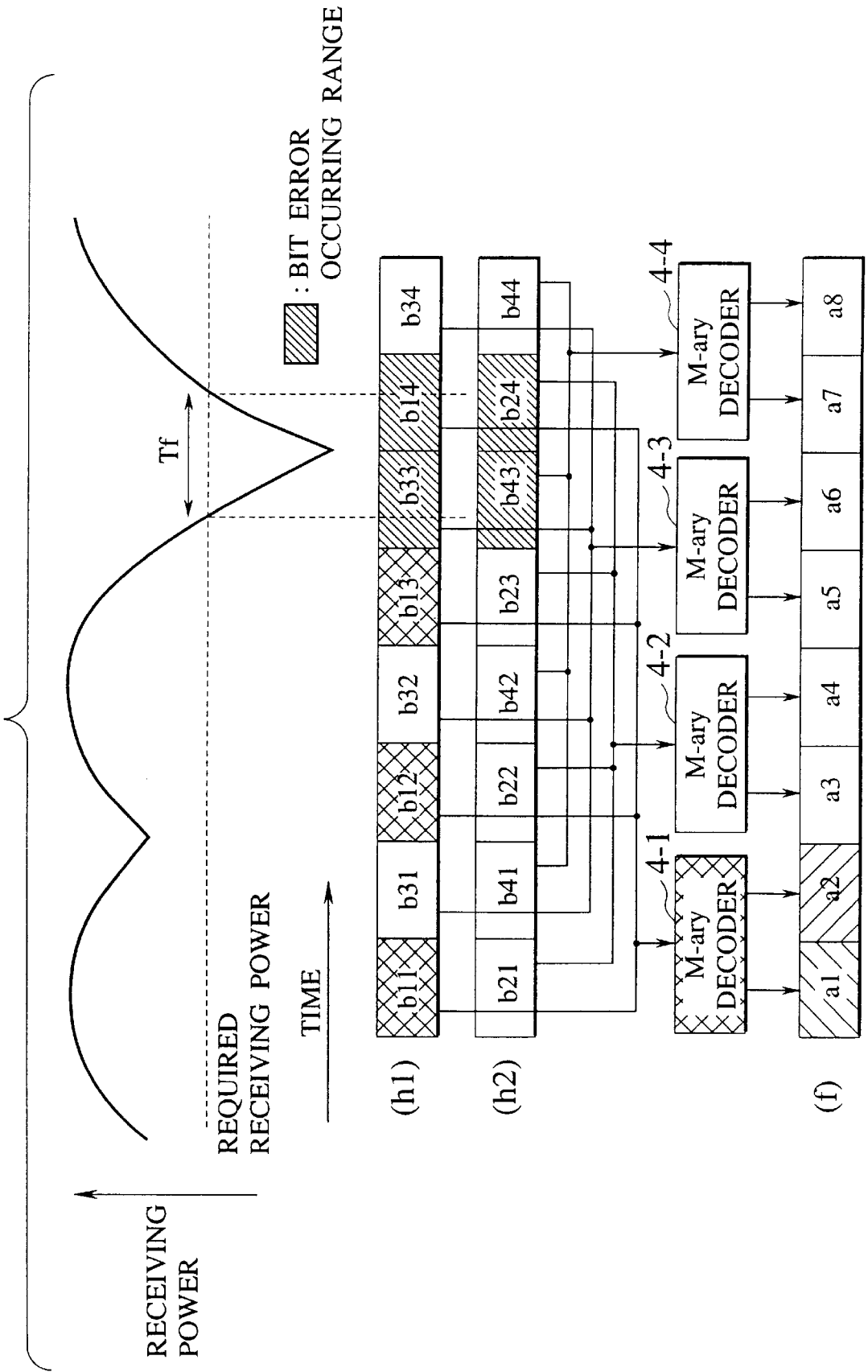
FIG. 14 is a diagram showing an exemplary signal processing at the receiving side of the digital modulation and demodulation system of FIG. 11.

FIG. 14 shows an exemplary signal processing subsequent to the output of the multi-valued detector 11 in FIG. 11, which is in correspondence to FIG. 10. The four times multiplexed detector output (h1) and (h2) (at a point (h) indicated in FIG. 11) is separated into four data sequences by the separation unit 12 using the inverse operation of what was applied by the multiplexing unit 9 at the transmitting side. The separated four data sequences are then respectively entered into the M-ary decoders 4-1 to 4-4. At each of the M-ary decoders 4-1 to 4-4, the orthogonal code with the highest correlation value with respect to the input is judged as a received signal, and the original 2 bits data corresponding to this orthogonal code that is judged as a received signal are obtained according to the same conversion rule of FIG. 2 as used at the transmitting side and then outputted. The four sequences of 2 bits data outputted from the M-ary decoders 4-1 to 4-4 are then recomposed into the original 8 bits data (i) (at a point (i) indicated in FIG. 11) by the composition unit 8 using the inverse operation of what was applied at the transmitting side.

Next, the reason why it is hard to cause errors by the receiving power dropping due to fading in this embodiment will be described. In FIG. 12, the 4 bits orthogonal code corresponding to the input data bit a1 (or a2) at a shaded location in the input signal (a) is arranged at locations b11 to b14 which are dispersed in time in the modulator input (g1). Consequently, only one bit at b14 falls within the receiving power dropping time Tf due to fading shown in FIG. 14 (which is assumed to be identical to Tf shown in FIG. 3 and FIG. 10), similarly as in the first embodiment. As a result, the probability for being erroneously Judged as another orthogonal code at a time of the correlation detection is low, so that it is possible to reduce the occurrences of bursty errors due to fading compared with the conventional case, Just like the first embodiment.

Note that the multi-valued number can be 8-valued or 16-valued instead of 4-valued, and in these cases the number G of the modulator input signal sequence (gi) and the detector output signal sequence (hi) also increases to 3 sequences ($2^3$=8-valued) or 4 sequences ($2^4$=16-valued). In order to realize the advantageous effect of the dispersion in time according to the present invention in these cases, it suffices to set the number N of divisions greater than or equal to the above described number G of sequences. For the larger number N of divisions, the effect of the dispersion in time becomes greater and it becomes possible to further reduce the occurrences of bursty errors due to fading.

As for the multi-valued modulation and demodulation method, it is possible to use various known methods besides the multi-valued FSK energy detection, such as the multi-valued PSK synchronous detection and the 16 QAM (Quadrature Amplitude Modulation) pilot synchronous detection.

Also, for the larger orthogonal code length M, the effect of the dispersion in time becomes greater and it becomes possible to further reduce the occurrences of bursty errors due to fading.

Figure 15:
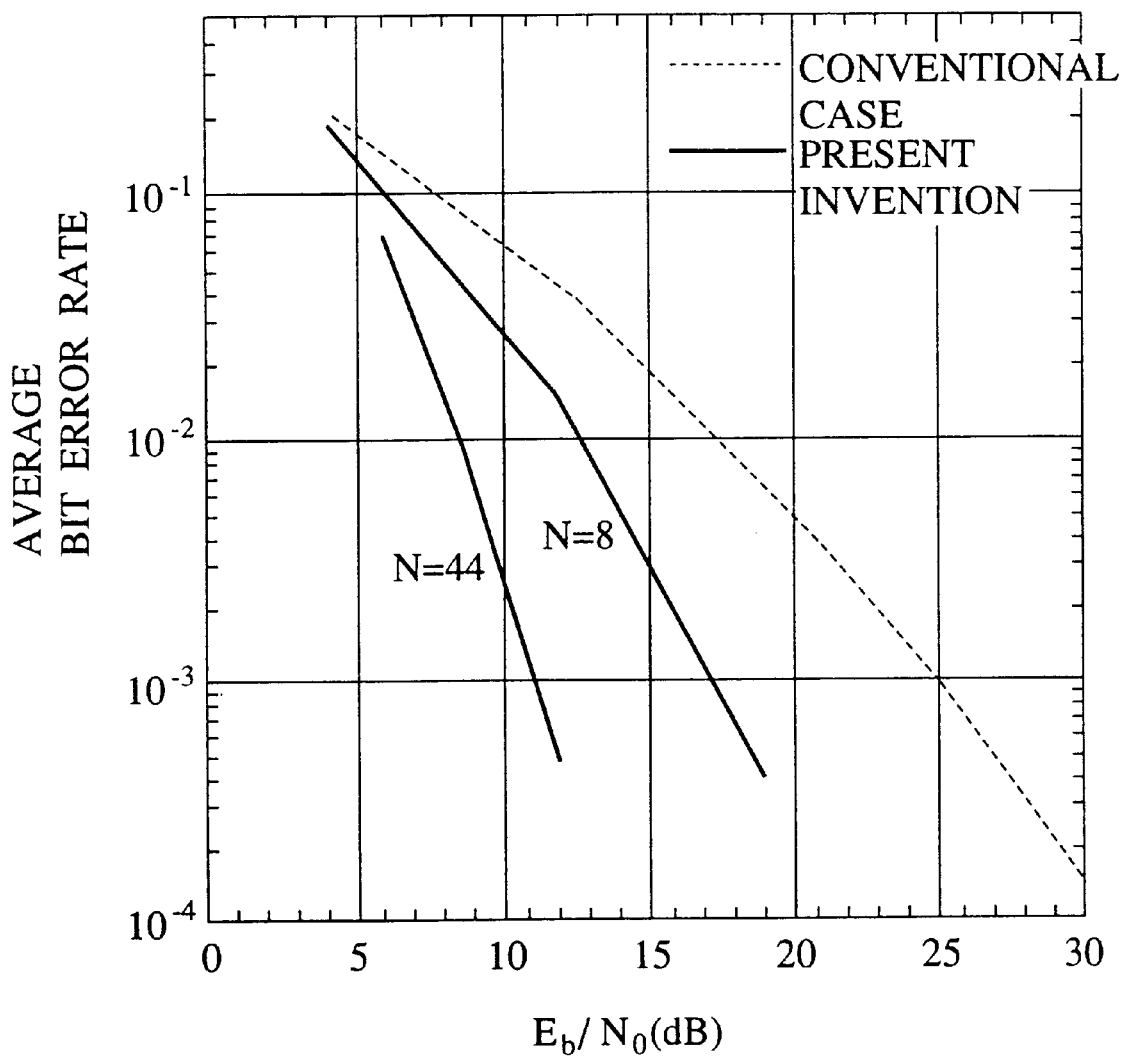
FIG. 15 is a graph of average bit error rate versus $E_b/N_\phi$ showing an effect of the digital modulation and demodulation system according to the present invention in comparison with the conventional case.

Next, with reference to FIG. 15, the effect of the, digital modulation and demodulation scheme according to the present invention will be described in comparison with the conventional case. FIG. 15 shows results obtained in an exemplary case of transmitting 200 bps modulation signals under the condition of the maximum Doppler frequency equal to 4 Hz, using L=4, M=16 and the 4-valued FSK modulation energy detection. The horizontal axis represents the received S/N ratio normalized to one bit ($E_b/N_o$), and the vertical axis represents the average bit error rate. It can be seen that the bit error rate is considerably improved in the present invention (for both N=8 and N=44) compared with the conventional case. It can also be seen that the effect of improvement is greater for the larger N because the averaging effect becomes greater.

As described, according to the present invention, the orthogonal code to be transmitted is dispersed over N times greater length on the time axis before transmission, and the orthogonal code in the state of being dispersed in time (which contains noise) is detected by correlation at the receiving side, so as to avoid the influence of the receiving power dropping due to fading and recover the original signal on the time axis, so that it is possible to reduce the occurrences of bursty errors due to fading and therefore it is possible to reduce the required reception S/N ratio. As a consequence, it becomes possible to reduce either the terminal transmission power or the number of receiving stations necessary in receiving the uplink signals, so that it becomes possible to construct an economical system. Also, in the case of using CDMA scheme, it becomes possible to increase the capacity.

Referring now to FIG. 16 to FIG. 21, the third embodiment of a digital modulation and demodulation scheme for radio communications according to the present invention will be described in detail. This third embodiment is directed to a specific decoder configuration suitable for the digital modulation and demodulation scheme of the present invention described above.

Figure 16:
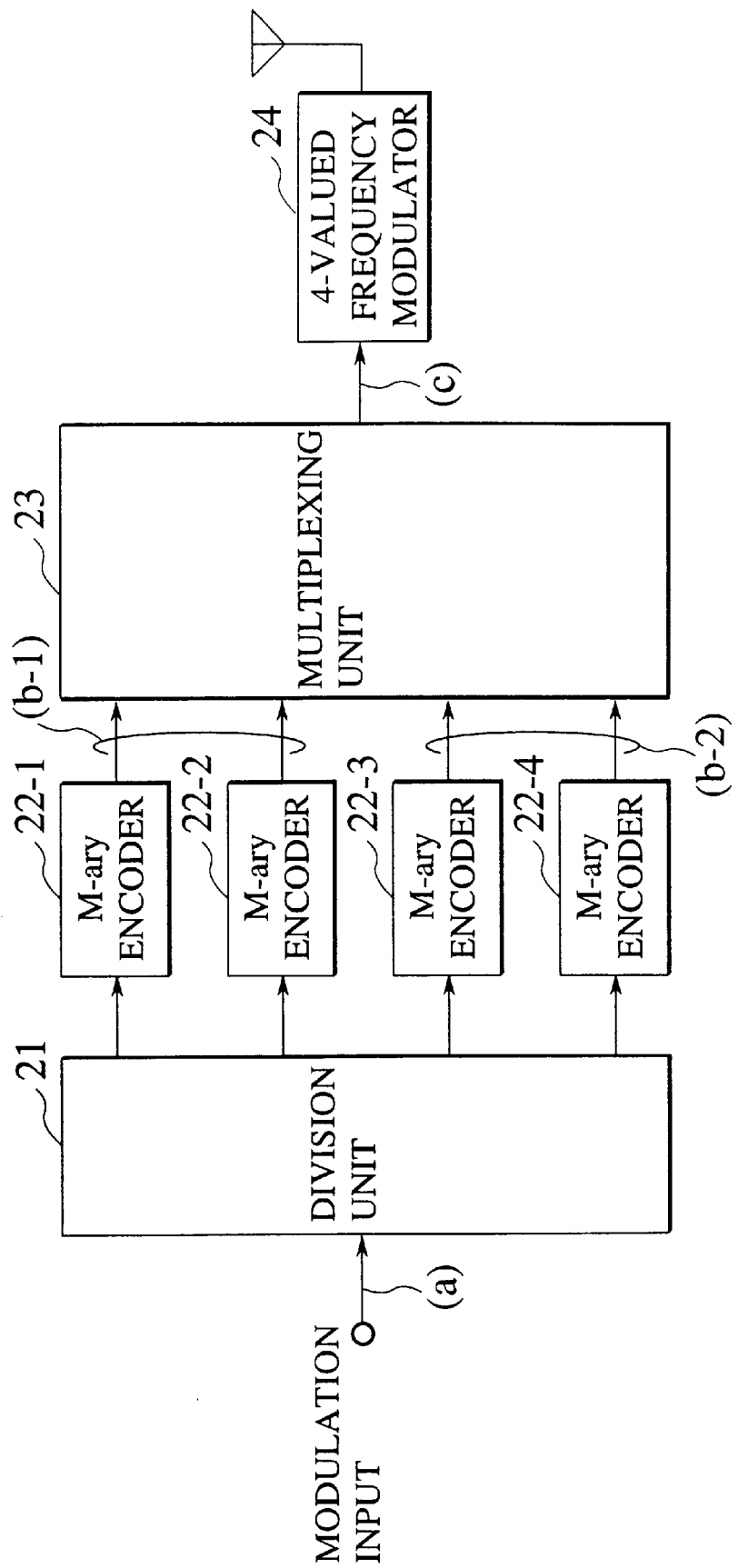
FIG. 16 is a block diagram showing a configuration of a transmitting side of the digital modulation and demodulation system according to the third embodiment of the present invention.
Figure 17:
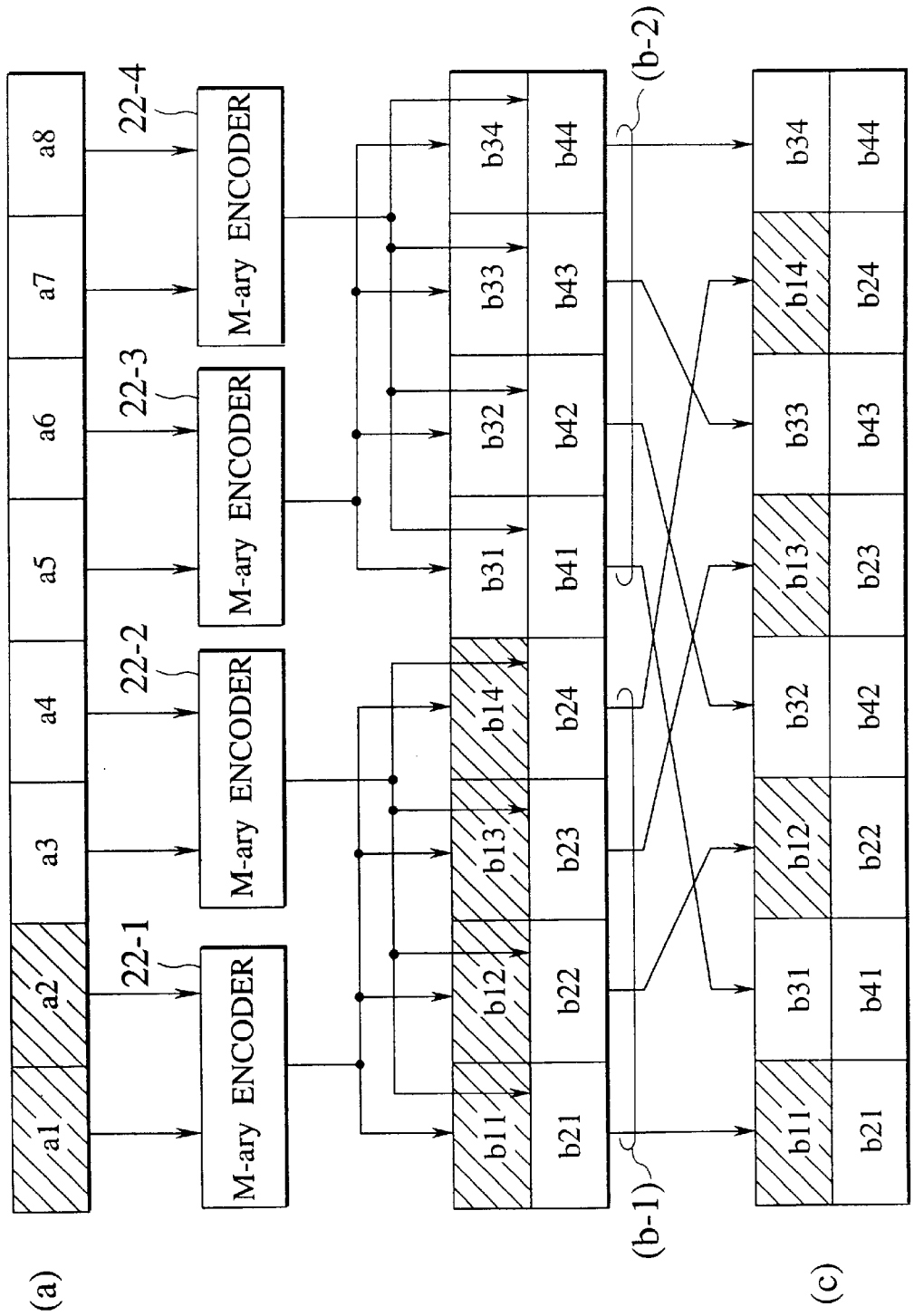
FIG. 17 is a diagram showing an exemplary signal processing at the transmitting side of the digital modulation and demodulation system of FIG. 16.

FIG. 16 shows a configuration of a transmitting side of the modulation and demodulation system in this third embodiment, and FIG. 17 shows a signal processing in this transmitting side of FIG. 16. This third embodiment uses multiplexing of four orthogonal codes (N=4) and 4-valued frequency modulation (G=2, $2^G$=4).

Figure 18:
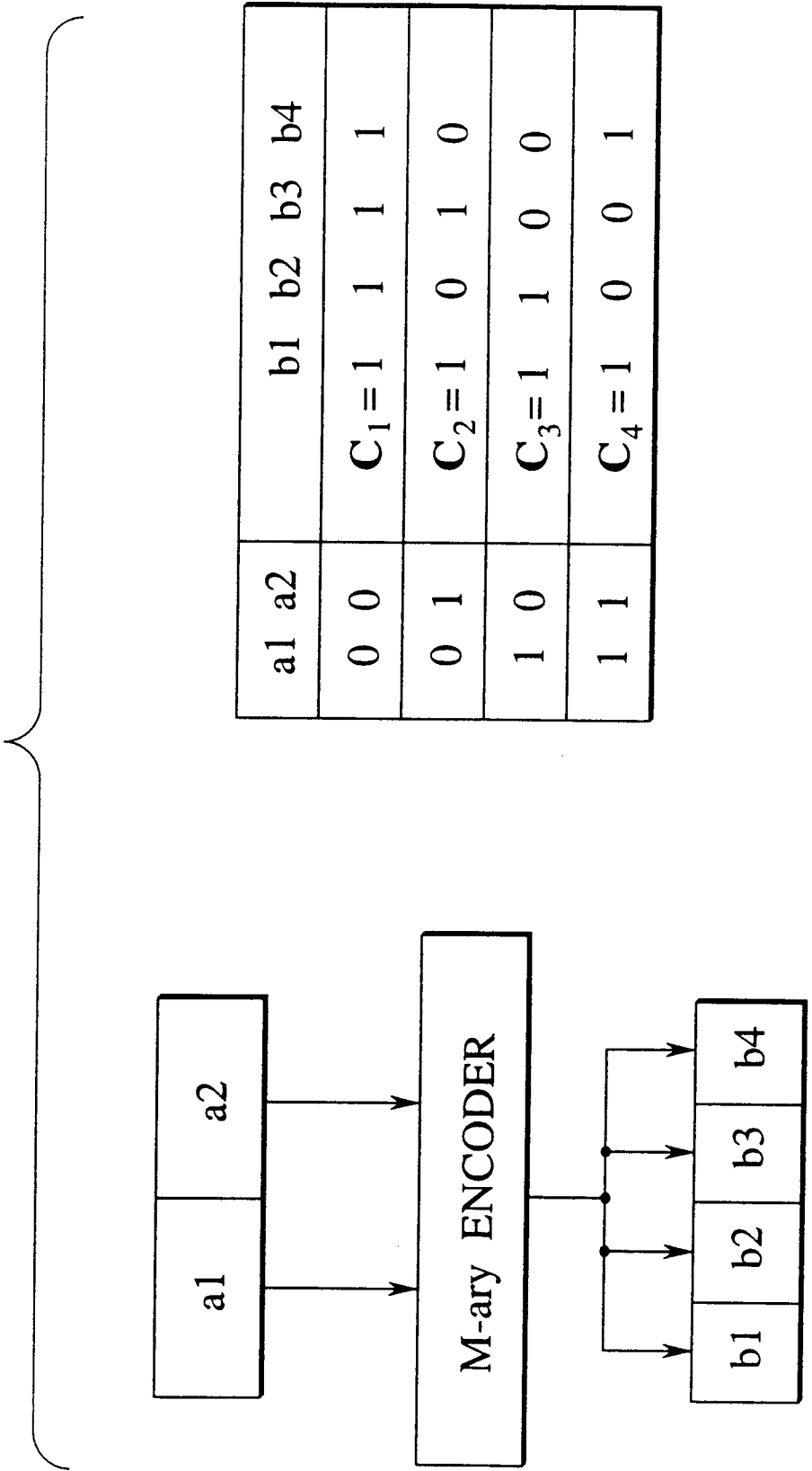
FIG. 18 is a diagram showing an exemplary relationship between inputs bits and output orthogonal code of the M-ary encoder in the transmitting side of the digital modulation and demodulation system of FIG. 16.

In FIG. 16, the bit sequence (a) at a modulation input is entered into a division unit 21. Then, as shown in FIG. 17, the division unit 17 enters 2 bits sequences constituting this bit sequence (a) into respective M-ary encoders 22-1 to 22-4, and each M-ary encoder outputs 4 bits length orthogonal code corresponding to the input. In the case of L=2 and N=4, the relationship between the input bits and the output orthogonal code of the M-ary encoder is as shown in FIG. 18. The orthogonal codes are then entered into a multiplexing unit 23 so as to multiplex outputs of the M-ary encoders into a series of symbol sequence (c). Here, as shown in FIG. 17, the multiplexing unit 23 carries out the multiplexing such that outputs from two M-ary encoders are taken together as one symbol and outputs (b-1) and (b-2) are arranged alternately in the symbol sequence (c), because the 4-valued frequency modulation is to be carried out. The output symbol sequence (c) of the multiplexing unit 23 is then entered into a 4-valued frequency modulator 24 and the 4-valued frequency modulation is carried out therein.

Figure 19:
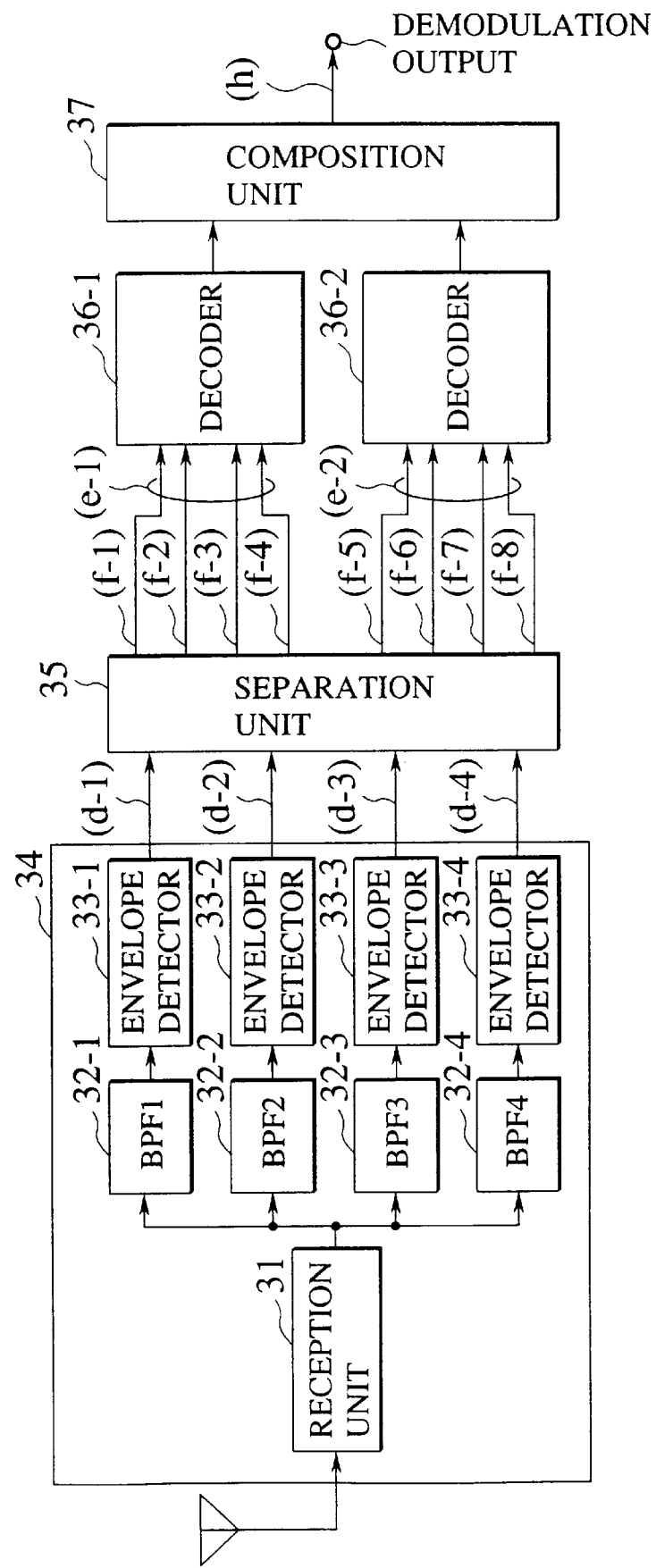
FIG. 19 is a block diagram showing a configuration of a receiving side of the digital modulation and demodulation system according to the third embodiment of the present invention.
Figure 20:
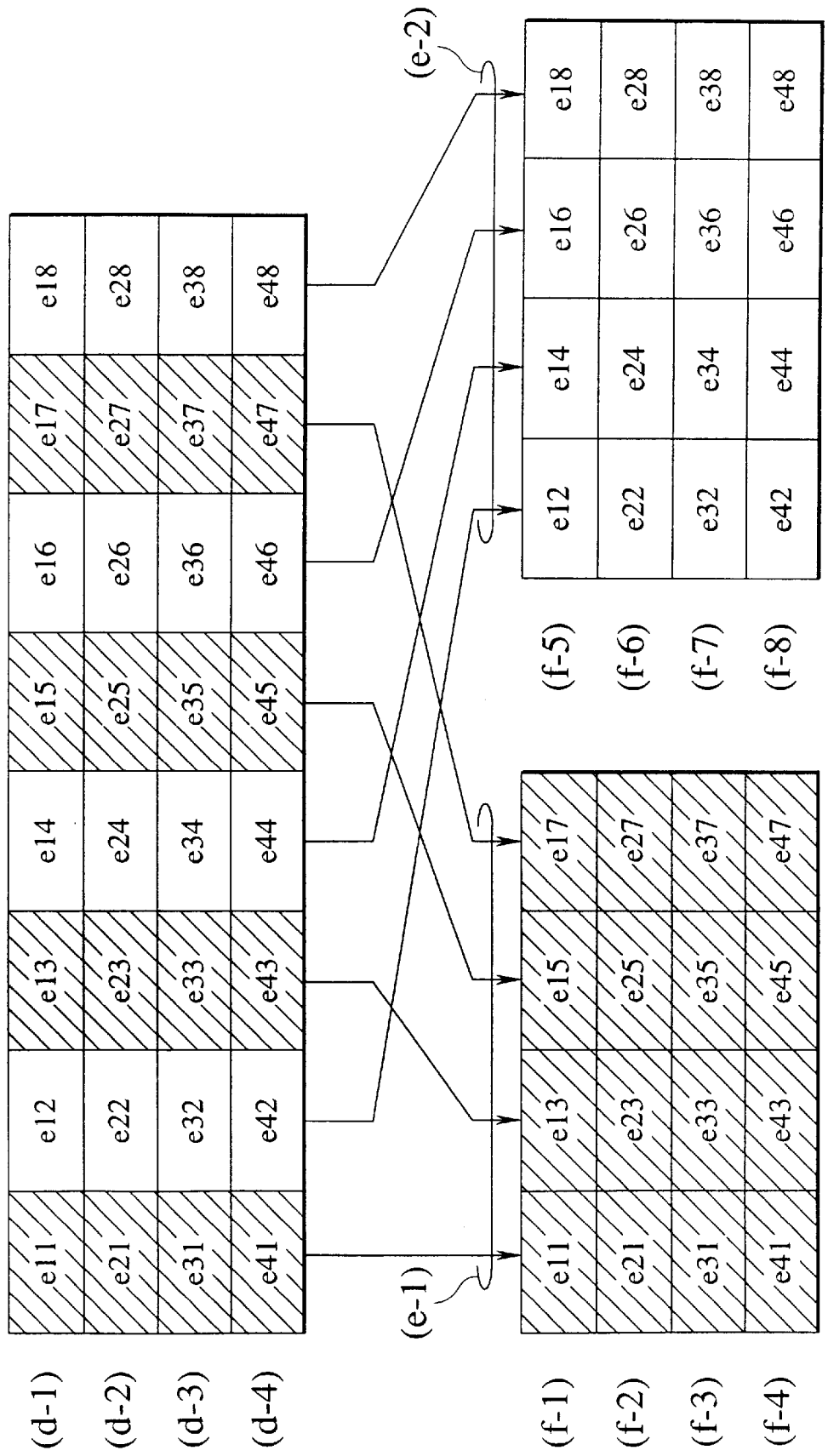
FIG. 20 is a diagram showing an exemplary signal processing at the receiving side of the digital modulation and demodulation system of FIG. 19.

FIG. 19 shows a configuration of a receiving side of the modulation and demodulation system in this third embodiment. At the receiving side, signals received at a reception unit 31 are entered into four band-pass filters (BPF) 32-1, 32-2, 32-3 and 32-4 having the central frequencies ω1, ω2, ω3 and ω4, respectively. The output signals of the band-pass filters are entered into corresponding envelope detectors 33-1 to 33-4 to obtain detector output signals (d-1) to (d-4) which are then entered into a separation unit 35. Then, as shown in FIG. 20, the separation unit 35 applies the inverse operation of what was applied by the multiplexing unit 23, i.e., takes detector output signals (d-1) to (d-4) that are outputted at the same timing as one set, and separates it into two output sequences (e-1) and (e-2), which are then entered into corresponding decoders 36-1 and 36-2 respectively. The detector output signal that appears hatched in FIG. 20 is obtained by energy detecting a signal in which bits that appear hatched in FIG. 17 are modulated. The outputs of the decoders 36-1 and 36-2 are then entered into a composition unit 37 where they are composed together to form an output bit sequence (h) which is outputted at a demodulation output.

Figure 21:
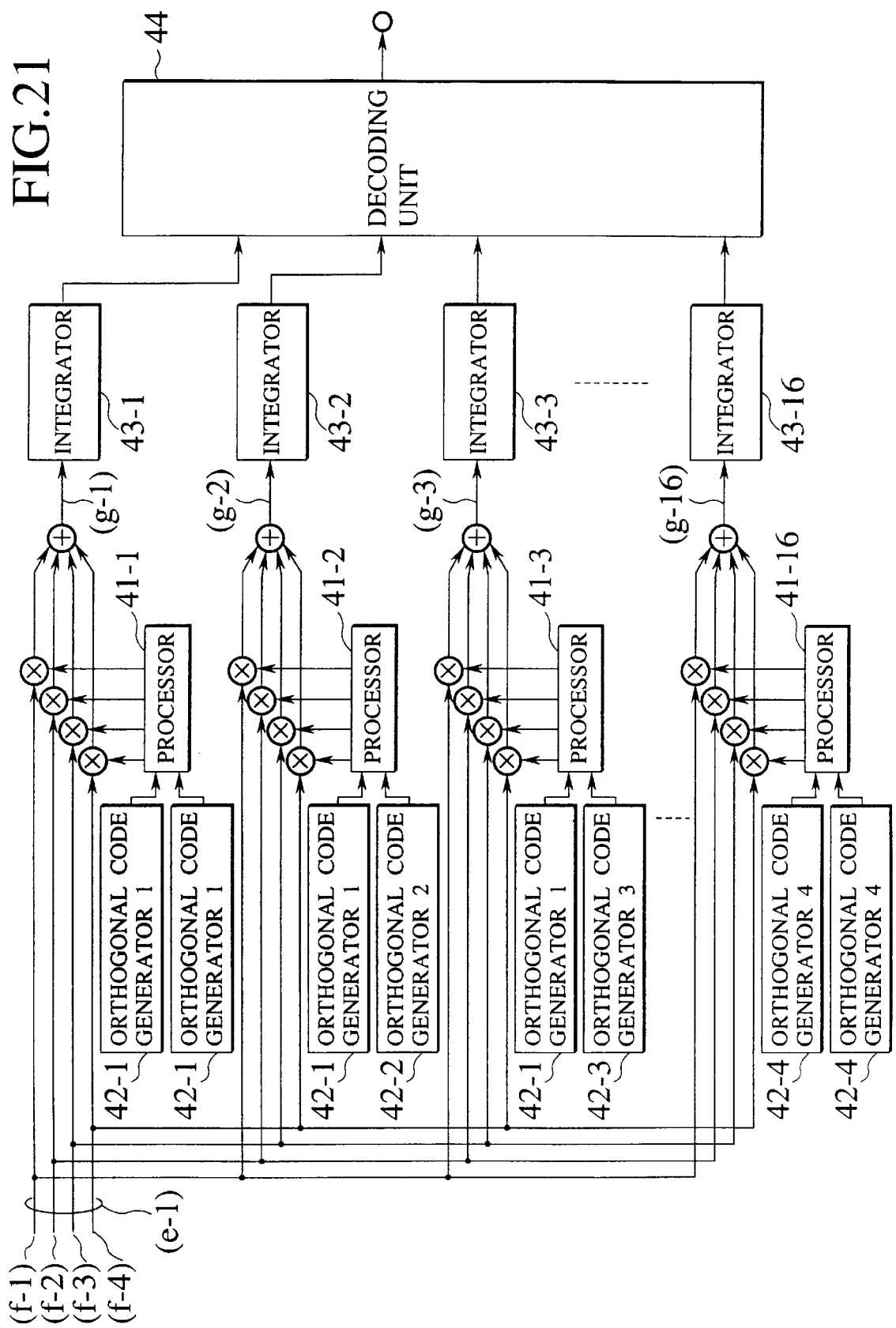
FIG. 21 is a block diagram showing an internal configuration of a decoder in the receiving side of the digital modulation and demodulation system of FIG. 19.

FIG. 21 shows an internal configuration of the decoder 36-1 in the configuration of FIG. 19. The decoder 36-2 also has the similar internal configuration. In this decoder configuration of FIG. 21, the detector output signal (e-1) after the separation is multiplied with each one of energy detection output patterns generated in advance by $2^{L \cdot G}$ sets of processors 41-1 to 41-16. Here, as indicated in FIG. 21, the processors 41 are provided with as many as the total number of patterns that can be generated by pairing each orthogonal code generator used at the transmitting side with every orthogonal code generator used at the transmitting side. In this embodiment, the total number of orthogonal codes that are outputted from the M-ary encoders is $2^L = 2^2 = 4$, and one symbol comprises 2 bits, so that the total number of patterns that can be generated is given by $4^2 = 16$ and therefore 16 processors 41-1 to 41-16 are provided in the decoder.

Now, the method for generating the energy detection output pattern in advance at each processor 41 will be described.

In general terms, every element of the orthogonal code generated by each orthogonal code generator is applied with a conversion which converts a bit with a value 0 into a value −1 and leaves a bit with a value 1 unchanged. This conversion is applied here for the sake of later convenience because a value 0 will be inconvenient in calculating a product at the subsequent calculation.

Then, G sets of converted M bits length orthogonal code C'n=[$C'_{n\,1}$, $C'_{n\,2}$, ... $C'_{n\,M}$] (which can be regarded as a row vector) are arranged vertically to form a G×M matrix which defines codes $W_r$ given by the following equation (1), because as many as G sequences entered into the frequency modulator will be multi-valued.

$$\begin{pmatrix} C'_{11}, & C'_{12}, & \ldots, & C'_{1M} \\ C'_{21}, & C'_{22}, & \ldots, & C'_{1M} \\ \vdots & \vdots & & \vdots \\ C'_{G1}, & C'_{G2} & \ldots, & C'_{GM} \end{pmatrix} = [w_1, w_2, \ldots, w_M]_r = W_r \quad (1)$$

where ${}^t w_i = [C'_{1\,i}, C'_{2\,i}, C'_{G\,i}]$ (row vector), t denotes transpose, and r=1 to $2^{L\cdot G}$. Here, one row can contain as many elements as the total number of the orthogonal codes which is $2^{n\,L}$ so that this matrix can contain as many elements as r=$2^{L\cdot G}$.

Then, using codes $W_r$ so obtained, the expression given by the following equation (2) is calculated.

$$\frac{1}{G} H W_r = \frac{1}{G} \begin{pmatrix} -1, & -1, & \ldots, & -1, & -1 \\ -1, & -1, & \ldots, & -1, & 1 \\ \vdots & & & & \vdots \\ 1, & 1, & \ldots, & 1, & -1 \\ 1, & 1, & \ldots, & 1, & 1 \end{pmatrix} W_r \quad (2)$$

where H is a $2^G \times G$ matrix obtained by arranging every possible combination of elements 1 and −1. This expression gives an energy detection output pattern in the case of transmitting $W_r$ from the transmitting side, where G is a normalization factor.

Finally, this expression of the equation (2) is applied with a conversion which converts an element with a value less than 1 into a value 0 and leaves every element with a value 1 unchanged, so as to obtain the energy detection output pattern $F_r$ given by the following equation (3).

$$\frac{1}{G} H W_r \rightarrow ([f_1, f_2, \ldots, f_M])_r = F_r \quad (3)$$

where an arrow denotes the above conversion. This conversion is applied because a value less than 1 corresponds to a signal that would actually not be generated in the case of transmitting $W_r$.

In terms of the example described above, using one orthogonal code $C_1 = [C_{1\,1}, C_{1\,2}, C_{1\,3}, C_{1\,4}]$ generated by one orthogonal code generator and another orthogonal code $C_2 = [C_{2\,1}, C_{2\,2}, C_{2\,3}, C_{2\,4}]$ generated by another orthogonal code generator, the codes $W_r$ are generated as follows. Namely, according to the above equation (1), the processor 41-1 uses two orthogonal code generators 42-1 which generates $C_1 = [1, 1, 1, 1]$ that is converted into $C'_1 = [1, 1, 1, 1]$ so that it generates $W_1$ given by the following equation (4).

$$W_1 = \begin{pmatrix} 1, & 1, & 1, & 1 \\ 1, & 1, & 1, & 1 \end{pmatrix} \quad (4)$$

Similarly, the processor 41-2 uses one orthogonal code generator 42-1 which generates $C_1 = [1, 1, 1, 1]$ that is converted into $C'_1 = [1, 1, 1, 1]$ and another orthogonal code generator 42-2 which generates $C_2 = [1, 0, 1, 0]$ that is converted into $C'_2 = [1, -1, 1, -1]$ so that it generates $W_2$ given by the following equation (5).

$$W_2 = \begin{pmatrix} 1, & 1, & 1, & 1 \\ 1, & -1, & 1, & -1 \end{pmatrix} \quad (5)$$

By the similar processing, $W_3$ to $W_{1\,6}$ are also generated by the processors 42-3 to 42-16.

Then, using $W_1$ to $W_{1\,6}$ so obtained, the processors 41 calculates the above equations (2) as follows. Namely, the processor 41-1 calculates the following equation (6):

$$\frac{1}{G} HW_r = \frac{1}{2} \begin{pmatrix} -1, & -1 \\ -1, & 1 \\ 1, & -1 \\ 1, & 1 \end{pmatrix} \begin{pmatrix} 1, & 1, & 1, & 1 \\ 1, & 1, & 1, & 1 \end{pmatrix} \quad (6)$$

$$= \begin{pmatrix} -1, & -1, & -1, & -1 \\ 0, & 0, & 0, & 0 \\ 0, & 0, & 0, & 0 \\ 1, & 1, & 1, & 1 \end{pmatrix}$$

where G=2 and r=1, and i is a 4×2 matrix because G=2. This expression of the equation (6) is then converted, into the energy detection output pattern $F_1$ given by the following equation (7):

$$\begin{pmatrix} 0, & 0, & 0, & 0 \\ 0, & 0, & 0, & 0 \\ 0, & 0, & 0, & 0 \\ 1, & 1, & 1, & 1 \end{pmatrix} = F_1 \quad (7)$$

Similarly, the processor 41-2 calculates the following equation (8):

$$\frac{1}{G} HW_r = \frac{1}{2} \begin{pmatrix} -1, & -1 \\ -1, & 1 \\ 1, & -1 \\ 1, & 1 \end{pmatrix} \begin{pmatrix} 1, & 1, & 1, & 1 \\ 1, & -1, & 1, & -1 \end{pmatrix} \quad (8)$$

$$= \begin{pmatrix} -1, & 0, & -1, & 0 \\ -1, & -1, & -1, & -1 \\ 0, & 1, & 0, & 1 \\ 1, & 0, & 1, & 0 \end{pmatrix}$$

where G=2 and r=2, and H is a 4×2 matrix because G=2. This expression of the equation (8) is then converted into the energy detection output pattern $F_2$ given by the following equation (9):

$$\begin{pmatrix} 0, & 0, & 0, & 0 \\ 0, & 0, & 0, & 0 \\ 0, & 1, & 0, & 1 \\ 1, & 0, & 1, & 0 \end{pmatrix} = F_2 \quad (9)$$

By the similar processing, the energy detection output patterns $F_3$ to $F_{1\,6}$ are also generated by the processors 42-3 to 42-16 in advance.

Next, each one of the energy detection output patterns $F_1$ to $F_{1\,6}$ so obtained is multiplied with each one of four components (f-1) to (f-4) constituting the detector output signal (e-1) in synchronization, and then four resulting values are added together. Namely, (e11, e21, e31, e41) is multiplied with the first column of the energy detection output pattern, (e13, e23, e33, e43) is multiplexed with the second column of the energy detection output pattern, and so on. For instance, using the energy detection output pattern $F_1$ generated by the processor 41-1, (g-1)=(e41, e43, e45, e47) is obtained by the following calculations (10).

$$e11 \times 0 + e21 \times 0 + e31 \times 0 + e41 \times 1 = e41$$

$$e13 \times 0 + e23 \times 0 + e33 \times 0 + e43 \times 1 = e43$$

$$e15 \times 0 + e25 \times 0 + e35 \times 0 + e45 \times 1 = e45$$

$$e17 \times 0 + e27 \times 0 + e37 \times 0 + e47 \times 1 = e47 \tag{10}$$

By the similar calculations, (g-2) to (g-16) are also obtained from the other processors 41-2 to 41-16. These (g-1) to (g-16) are then integrated over a period corresponding to one orthogonal code at respective integrators 43-1 to 43-16, and the integrated signals are entered into a decoding unit 44. This decoding unit 44 selects the processor 41 that is used in obtaining the integrated signal which has the largest value among all the entered integrated signals, and outputs a bit sequence before the M-ary encoding which corresponds to the two orthogonal codes that are entered into that selected processor 41.

Referring now to FIG. 22 to FIG. 25, the fourth embodiment of a digital modulation and demodulation scheme for radio communications according to the present invention will be described in detail. This fourth embodiment is directed to another specific decoder configuration suitable for the digital modulation and demodulation scheme of the present invention described above.

Figure 22:
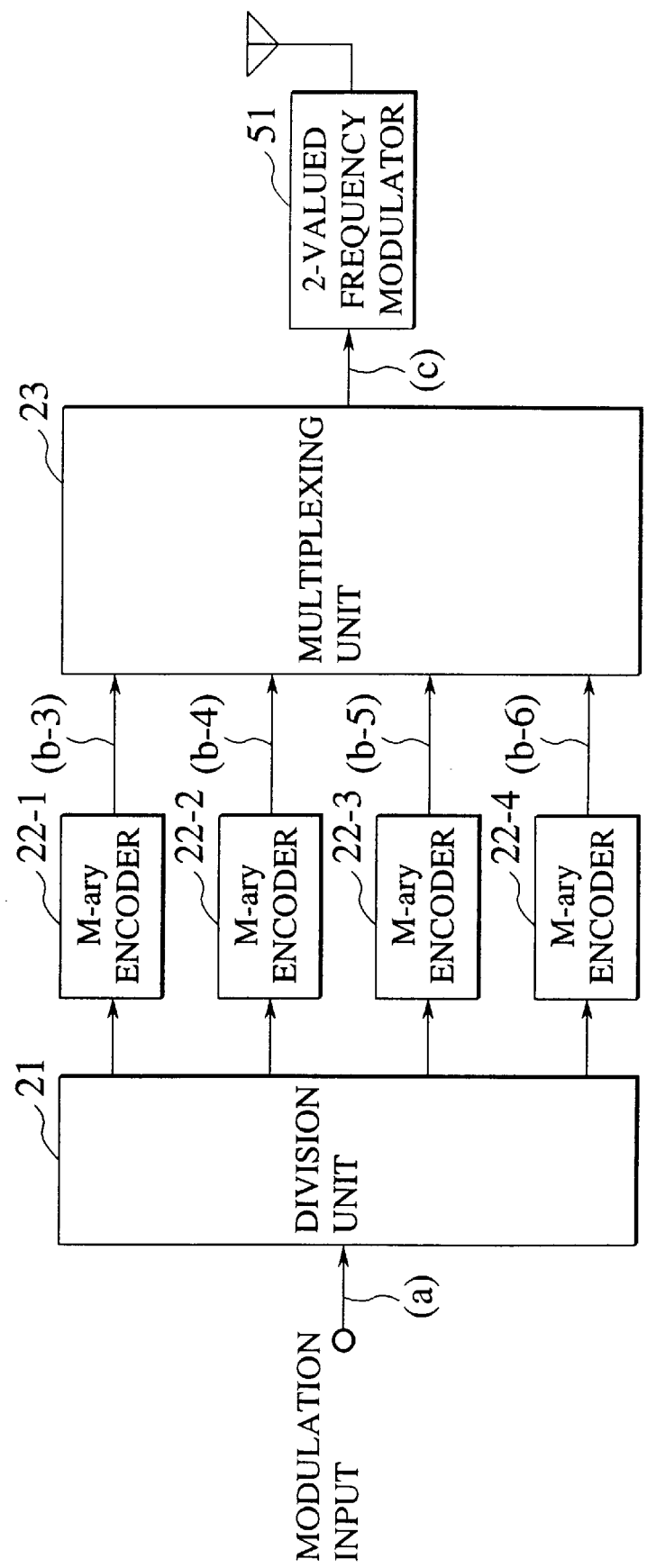
FIG. 22 is a block diagram showing a configuration of a transmitting side of the digital modulation and demodulation system according to the fourth embodiment of the present invention.
Figure 23:
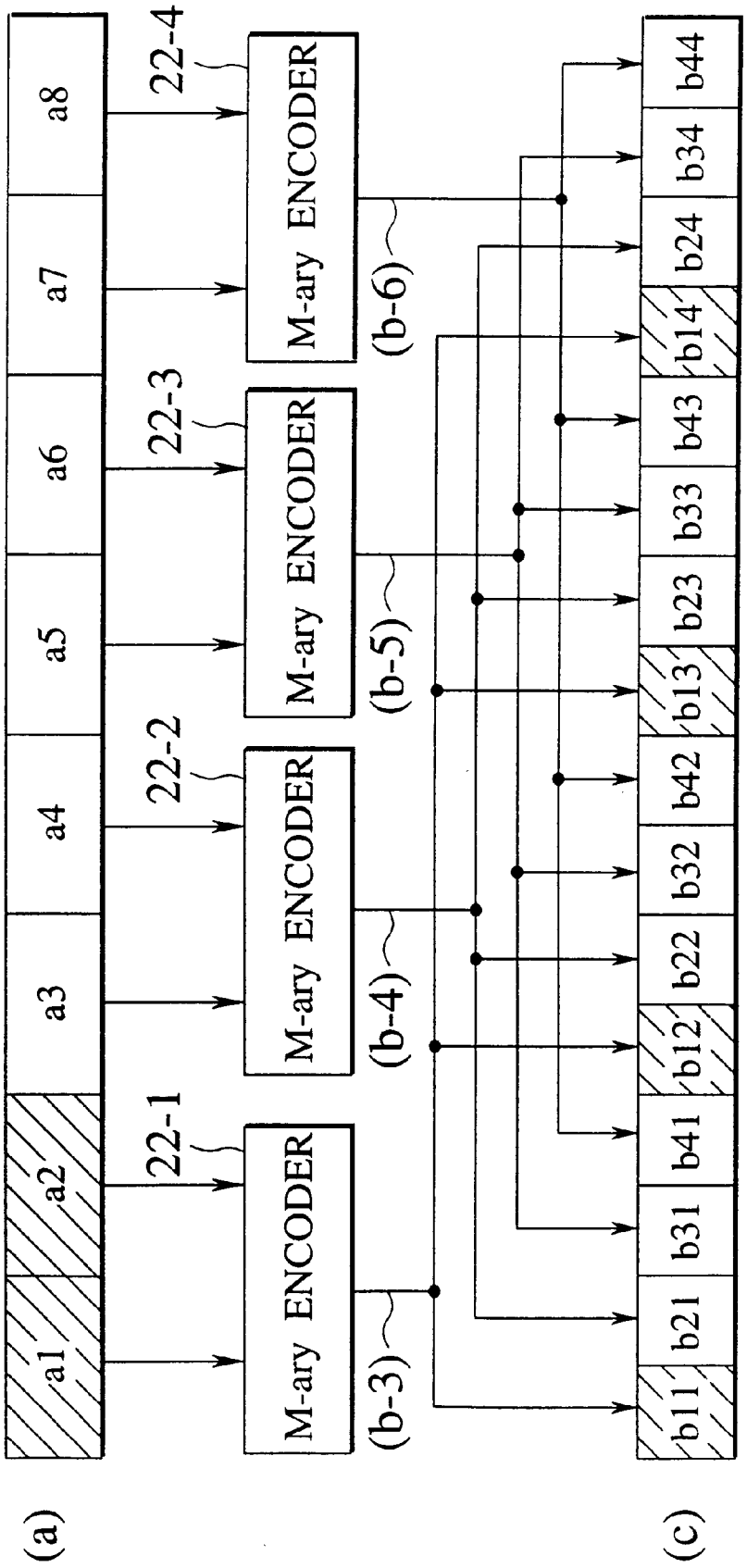
FIG. 23 is a diagram showing an exemplary signal processing at the transmitting side of the digital modulation and demodulation system of FIG. 22.

FIG. 22 shows a configuration of a transmitting side of the modulation and demodulation system in this third embodiment, and FIG. 23 shows a signal processing in this transmitting side of FIG. 22. This fourth embodiment uses multiplexing of four orthogonal codes (L=2, $2^L$=4) and 2-valued frequency modulation (G=1, $2^G$=2).

In FIG. 22, the bit sequence (a) at a modulation input is entered into a division unit 21. Then, as shown in FIG. 23, the division unit 17 enters 2 bits sequences constituting this bit sequence (a) into respective M-ary encoders 22-1 to 22-4, and these M-ary encoders output 4 bits length orthogonal codes (b-3) to (b-6) corresponding to their respective inputs, similarly as in the third embodiment. The orthogonal codes are then entered into a multiplexing unit 23 so as to multiplex outputs of the M-ary encoders into a series of symbol sequence (c). Here, the 2-valued frequency modulation is to be carried out so that one symbol comprises one bit, and therefore, as shown in FIG. 23, the multiplexing unit 23 carries out the multiplexing such that outputs (b-3), (b-4), (b-5) and (b-6) are arranged alternately in the symbol sequence (c). The output symbol sequence (c) of the multiplexing unit 23 is then entered into a 2-valued frequency modulator 31 and the 2-valued frequency modulation is carried out therein.

Figure 24:
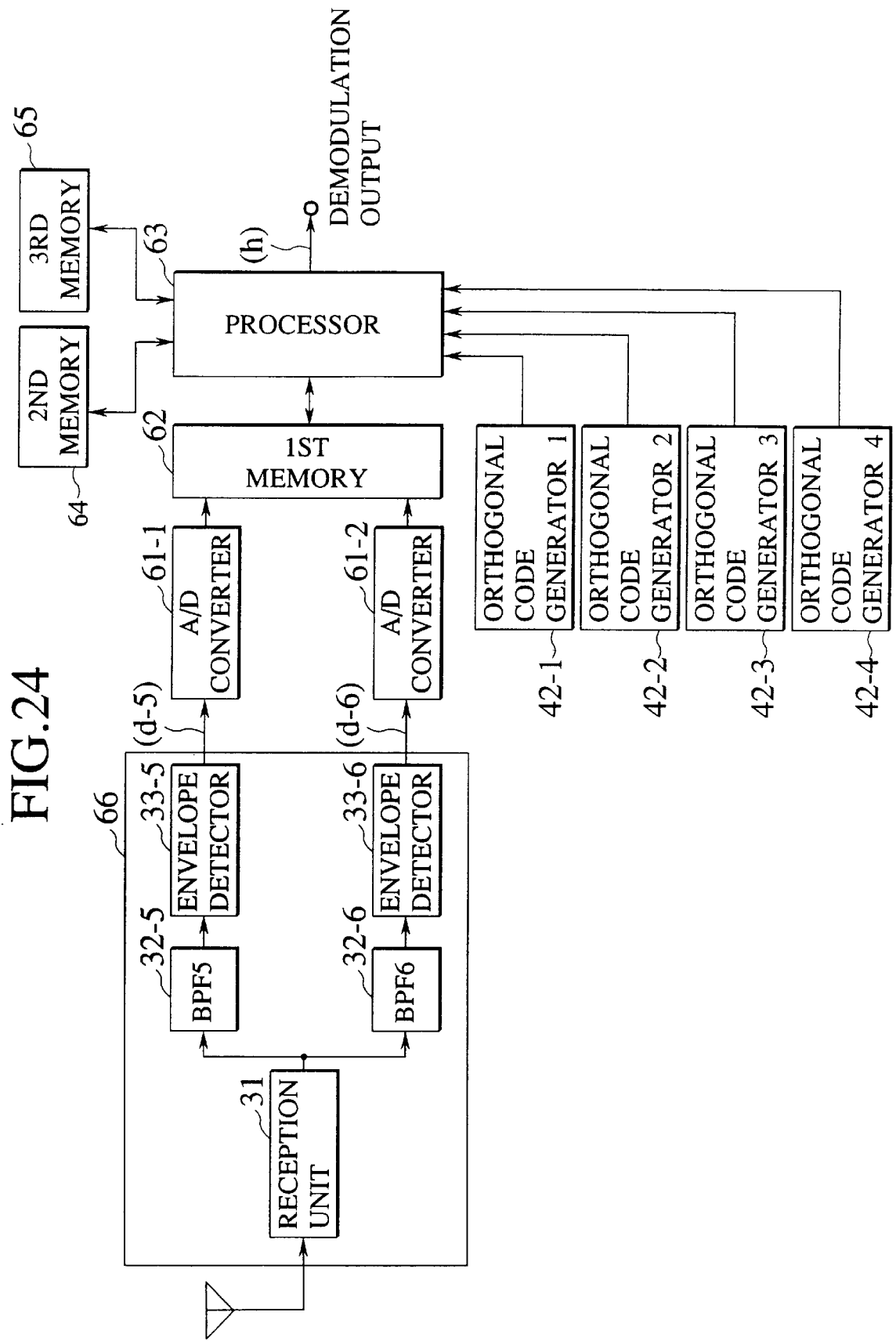
FIG. 24 is a block diagram showing a configuration of a receiving side of the digital modulation and demodulation system according to the fourth embodiment of the present invention.

FIG. 24 shows a configuration of a receiving side of the modulation and demodulation system in this fourth embodiment, which comprises a 2-valued energy detector 66, A/D converters 61-1 and 61-2, a first memory 62, a second memory 64, a third memory 65, a processor 63, and orthogonal code generators 42-1 to 42-4. The 2-valued energy detector 66 further comprises a reception unit 31, band-pass filters 32-5 and 32-6, and envelope detectors 33-5 and 33-6. In this configuration of FIG. 24, the processing of the separation unit 35, the decoders 36-1 and 36-2 and the composition unit 37 of the third embodiment described above is carried out by the processor 63.

Figure 25:
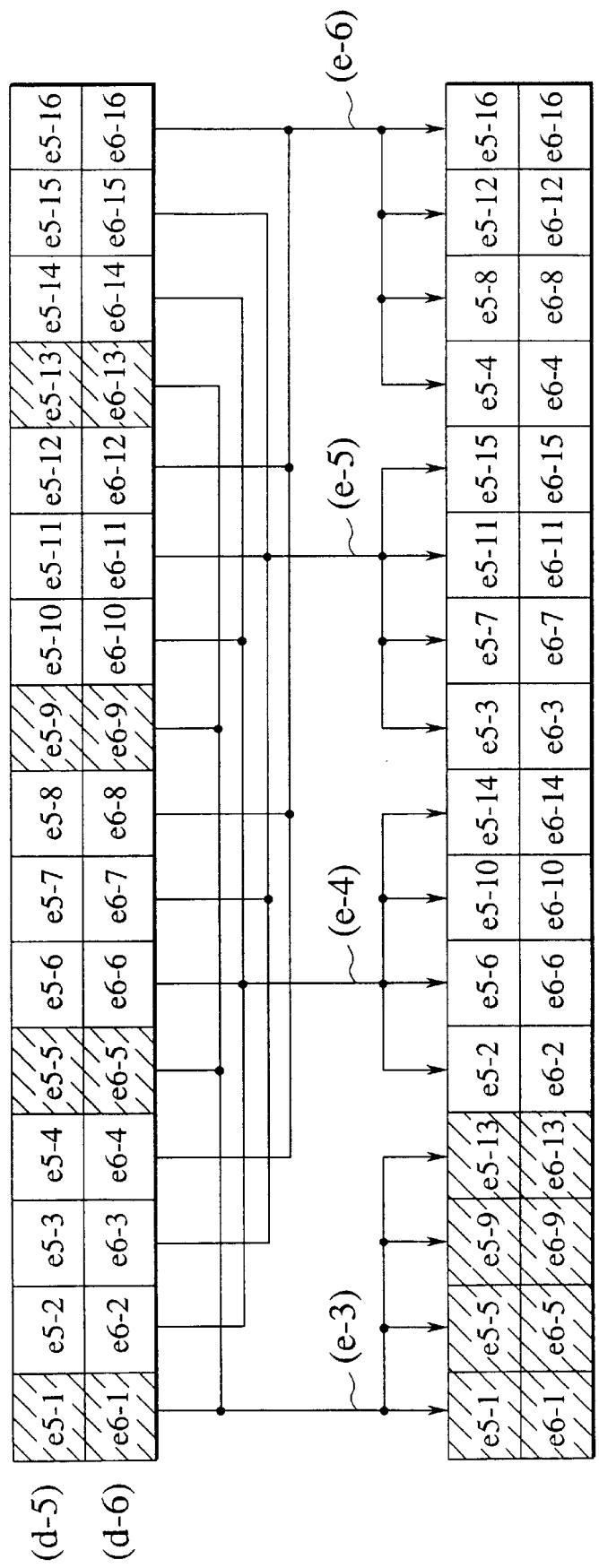
FIG. 25 is a diagram showing an exemplary signal processing at the receiving side of the digital modulation and demodulation system of FIG. 24.

In FIG. 24, signals received at a reception unit 31 are entered into two band-pass filters (BPF) 32-5 and 32-6 having the central frequencies $\omega 5$ and $\omega 6$, respectively. The output signals of the band-pass filters are entered into corresponding envelope detectors 33-5 to 33-6 to obtain two detector output signals (d-5) and (d-6) which are then outputted from the 2-valued energy detector 66 to A/D converters 61-1 and 61-2 where the sampling is carried out. Then, as shown in FIG. 25, the inverse operation of what was applied by the multiplexing unit 23 is applied to rearrange the sampling values and the rearranged sampling values are stored into the first memory 62, under the control of the processor 63. This processing corresponds to the processing of the separation unit 35 of the third embodiment.

Next, the processor 63 receives orthogonal codes generated by four orthogonal code generators 42-1 to 42-4, and carries out the processing similar to that of the processor 41 of the third embodiment. In this fourth embodiment, the total number of orthogonal codes that are outputted from the M-ary encoders is $2^L$=4 (L=2), and one symbol comprises 1 bit (G=1), so that the total number of patterns that can be generated is given by $r=4^1=4$. Consequently, the processor 63 generates four energy detection output patterns as follows.

Namely, according to the equation (1), the processor 63 generates four codes $W_r$ in forms of row vectors given by the following equations (11) to (14).

$$W_1 = C'_1 = [1, 1, 1, 1] \tag{11}$$

$$W_2 = C'_2 = [1, -1, 1, -1] \tag{12}$$

$$W_3 = C'_3 = [1, 1, -1, -1] \tag{13}$$

$$W_4 = C'_4 = [1, -1, -1, 1] \tag{14}$$

Then, according to the equation (2), the expressions given by the following equations (15) to (18) are calculated. Here, G=1 so that H is a column vector (2×1 matrix).

For r=1:

$$\begin{pmatrix} -1 \\ 1 \end{pmatrix} [1, 1, 1, 1] = \begin{pmatrix} -1, & -1, & -1, & -1 \\ 1, & 1, & 1, & 1 \end{pmatrix} \tag{15}$$

For r=2:

$$\begin{pmatrix} -1 \\ 1 \end{pmatrix} [1, -1, 1, -1] = \begin{pmatrix} -1, & 1, & -1, & 1 \\ 1, & -1, & 1, & -1 \end{pmatrix} \tag{16}$$

For r=3:

$$\begin{pmatrix} -1 \\ 1 \end{pmatrix} [1, 1, -1, -1] = \begin{pmatrix} -1, & -1, & 1, & 1 \\ 1, & 1, & -1, & -1 \end{pmatrix} \tag{17}$$

For r=4:

$$\begin{pmatrix} -1 \\ 1 \end{pmatrix} [1, -1, -1, 1] = \begin{pmatrix} -1, & 1, & 1, & -1 \\ 1, & -1, & -1, & 1 \end{pmatrix} \tag{18}$$

Then, by converting these expressions (15) to (18) similarly as in the third embodiment, the energy detection output patterns $F_1$ to $F_4$ to be generated in advance which are given by the following expressions (19) to (22) are obtained.

From (15):

$$\begin{pmatrix} 0, & 0, & 0, & 0 \\ 1, & 1, & 1, & 1 \end{pmatrix} = F_1 \tag{19}$$

From (16):

$$\begin{pmatrix} 0, & 1, & 0, & 1 \\ 1, & 0, & 1, & 0 \end{pmatrix} = F_2 \quad (20)$$

From (17):

$$\begin{pmatrix} 0, & 0, & 1, & 1 \\ 1, & 1, & 0, & 0 \end{pmatrix} = F_3 \quad (21)$$

From (18):

$$\begin{pmatrix} 0, & 1, & 1, & 0 \\ 1, & 0, & 0, & 1 \end{pmatrix} = F_4 \quad (22)$$

The obtained $F_1$ to $F_4$ are then stored into the second memory 64.

Next, the processor 63 reads out the sampling value (e-3) stored in the first memory 62 and the $F_1$ stored in the second memory 64, and multiplies each element of the sampling value (e-3) with $F_1$, add them together, and integrates the resulting value over a period corresponding to one orthogonal code, similarly as in the third embodiment. The similar processing is also repeated for $F_2$ to $F_4$. Then, the energy detection output pattern that is used in obtaining the integrated signal which has the largest value among all the obtained four integrated signals is selected, and outputs a 2 bits before the M-ary encoding which correspond to the orthogonal code that is used in obtaining the selected energy detection output pattern. The bit sequence so obtained is then stored in the third memory 65. This processing corresponds to the processing of the decoders 36-1 and 36-2 of the third embodiment.

The above processing is similarly carried out for the other sampling values (e-4) to (e-6), and the obtained bit sequences are similarly stored in the third memory 65.

Finally, 8 bits stores in the third memory 65 are sequentially read out and outputted as an output bit sequence (h) at a demodulation output, under the control of the processor 63. This processing corresponds to the processing of the composition unit 37 of the third embodiment.

As described, according to a decoder of the present invention, the energy detection output patterns based on the $2^G$-Valued frequency modulation are provided in advance with respect to all the orthogonal codes, and the correlation value between the received energy detection output signal and every energy detection output pattern provided in advance is calculated, an orthogonal code having the highest correlation value among all the calculated correlation values is determines, and data bits corresponding to this orthogonal code with the highest correlation value are obtained, so that the code judgement device for Judging a code of the detector output signal becomes unnecessary so that the coding gain due to the orthogonal codes can be increased and it becomes possible to realize the high quality signal transmission in the mobile communication that involves fading.

It is to be noted that, besides those already mentioned above, many modifications and variations of the above embodiments may be made without departing from the novel and advantageous features of-the present invention. Accordingly, all such modifications and variations are intended to be included within the scope of the appended claims.

What is claimed is:

1. A digital modulation and demodulation system for radio communications, comprising:
   a transmitting side device having:
   a division unit for dividing transmission data in advance, into blocks of LN bits length each, where L and N are natural number greater than one, and dividing each block into N sets of L bits data sequences;
   an encoding unit for generating orthogonal codes of M bits length each, where M is a natural number, which are uniquely defined with respect to L bits codes given by the L bits data sequences obtained by the division unit;
   a multiplexing unit for multiplexing N sets of orthogonal codes generated by the encoding unit for each block into a multiplexed signal, such that M bits constituting each orthogonal code are dispersed in time in the multiplexed signal; and
   a modulation unit for applying a digital modulation to a carrier using the multiplexed signal obtained by the multiplexing unit; and
   a receiving side device having:
   a detection unit for obtaining a detection output of signals received from the transmitting side;
   a separation unit for setting the detection output obtained by the detection unit into reception data-units of NM bits length each in synchronization with multiplexing applied at the transmitting side, and separating each reception data-unit into N sets of M bits sequences;
   a decoder for obtaining a correlation between each M bits sequence obtained by the separation unit and every possible orthogonal code defined at the transmitting side device, selecting one orthogonal code with a highest correlation, and outputting an L bits data sequence corresponding to each selected orthogonal code; and
   a composition unit for recovering an original LN bits signal by applying an inverse operation of an operation applied at the transmitting side device, with respect to N sets of L bits data sequences outputted by the decoder for each reception data-unit.

2. The digital modulation and demodulation system of claim 1, wherein the modulation unit of the transmitting side device applies a $2^G$-valued frequency modulation, where G is a natural number, the detection unit of the receiving side device carries out an energy detection, and the decoder of the receiving side device further comprises:
   a processing unit for generating in advance energy detection output patterns based on the $2^G$-valued frequency modulation, with respect to all orthogonal codes defined at the transmitting side device;
   a correlation detection unit for obtaining a correlation value between an energy detection output signal obtained by the detection unit and every energy detection output pattern generated by the processing unit, and selecting one orthogonal code with a highest correlation value; and
   a decoding unit for outputting the L bits data sequence corresponding to each orthogonal code selected by the correlation detection unit.

3. The digital modulation and demodulation system of claim 2, wherein the processing unit generates the energy detection output patterns by:
   (a) converting every element of every orthogonal code with a value 0 into a value −1 while leaving every element of every orthogonal code with a value 1 unchanged, to obtain G sets of converted orthogonal codes $C'n = [C'_{n\ 1}, C'_{n\ 2}, \ldots, C'_{n\ M}]$ of M bits length each;

(b) arranging the converted orthogonal codes $C'_n$ vertically to form a G×M matrix which defines codes $W_r$ given by the following equation (1):

$$\begin{pmatrix} C'_{11}, & C'_{12}, & \ldots, & C'_{1M} \\ C'_{21}, & C'_{22}, & \ldots, & C'_{2M} \\ \vdots & \vdots & & \vdots \\ C'_{G1}, & C'_{G2}, & \ldots, & C'_{GM} \end{pmatrix} = ([w_1, w_2, \ldots, w_M])_r = W_r \quad (1)$$

where ${}^t w_j = [C'_{1\,i}, C'_{2\,i}, \ldots, G'_{G\,i}]$, t denotes transpose, and k=1 to $2^{L \cdot G}$:

(c) calculating an expression given by the following equation (2):

$$\frac{1}{G} H W_r = \frac{1}{G} \begin{pmatrix} -1, & -1, & \ldots, & -1, & -1 \\ -1, & -1, & \ldots, & -1, & 1 \\ \vdots & & & & \vdots \\ 1, & 1, & \ldots, & 1, & -1 \\ 1, & 1, & \ldots, & 1, & 1 \end{pmatrix} W_r \quad (2)$$

where H is a $2^G \times G$ matrix obtained by arranging every possible combination of elements 1 and −1; and (d) in the expression given by the above equation (2), converting every element with a value less than 1 into a value 0 while leaving every element with a value 1 unchanged, so as to obtain the energy detection output pattern $F_r$ given by the following equation (3):

$$\frac{1}{G} H W_r \rightarrow ([f_1, f_2, \ldots, f_M])_r = F_r. \quad (3)$$

4. A method of digital modulation and demodulation for radio communications, comprising the steps of:

(a) dividing transmission data in advance, into blocks of LN bits length each, where L and N are natural number greater than one, and dividing each block into N sets of L bits data sequences, at a transmitting side;

(b) generating orthogonal codes of M bits length each, where M is a natural number, which are uniquely defined with respect to L bits codes given by the L bits data sequences obtained by the step (a), at the transmitting side;

(c) multiplexing N sets of orthogonal codes generated by the step (b) for each block into a multiplexed signal, such that M bits constituting each orthogonal code are dispersed in time in the multiplexed signal, at the transmitting side;

(d) applying a digital modulation to a carrier using the multiplexed signal obtained by the step (c), at the transmitting side;

(e) obtaining a detection output of signals received from the transmitting side, at a receiving side;

(f) setting the detection output obtained by the step (e) into reception data-units of NM bits length each in synchronization with multiplexing applied at the transmitting side, and separating each reception data-unit into N sets of M bits sequences, at the receiving side;

(g) obtaining a correlation between each M bits sequence obtained by the step (f) and every possible orthogonal code defined at the transmitting side, selecting one orthogonal code with a highest correlation, and outputting an L bits data sequence corresponding to each selected orthogonal code, at the receiving side; and (h) recovering an original LN bits signal by applying an inverse operation of an operation applied at the transmitting side, with respect to N sets of L bits data sequences outputted by the step (g) for each reception data-unit, at the receiving side.

5. The method of claim 4, wherein the step (d) applies a $2^G$-valued frequency modulation, where G is a natural number, the step (e) carries out an energy detection, and the step (g) further comprises the sub-steps of:

(g1) generating in advance energy detection output patterns based on the $2^G$-valued frequency modulation, with respect to all orthogonal codes defined at the transmitting side;

(g2) obtaining a correlation value between an energy detection output signal obtained by the step (e) and every energy detection output pattern generated by the step (g1), and selecting one orthogonal code with a highest correlation value; and (g3) outputting the L bits data sequence corresponding to each orthogonal code selected by the step (g2).

6. The method of claim 5, wherein the step (g1) generates the energy detection output patterns by:

(g1a) converting every element of every orthogonal code with a value 0 into a value −1 while leaving every element of every orthogonal code with a value 1 unchanged, to obtain G sets of converted orthogonal codes $C'n = [C'_{n\,1}, C'_{n\,2}, \ldots, C'_{n\,M}]$ of M bits length each;

(g1b) arranging the converted orthogonal codes $C'_n$ vertically to form a G×M matrix which defines codes $W_r$ given by the following equation (1):

$$\begin{pmatrix} C'_{11}, & C'_{12}, & \ldots, & C'_{1M} \\ C'_{21}, & C'_{22}, & \ldots, & C'_{1M} \\ \vdots & \vdots & & \vdots \\ C'_{G1}, & C'_{G2} & \ldots, & C'_{GM} \end{pmatrix} = [w_1, w_2, \ldots, w_M]_r = W_r \quad (1)$$

where ${}^t w_j = [C'_{1\,i}, C'_{2\,i}, \ldots, C'_{G\,i}]$, t denotes transpose, and k=1 to $2^{L \cdot G}$:

(g1c) calculating an expression given by the following equation (2):

$$\frac{1}{G} H W_r = \frac{1}{G} \begin{pmatrix} -1, & -1, & \ldots, & -1, & -1 \\ -1, & -1, & \ldots, & -1, & 1 \\ \vdots & & & & \vdots \\ 1, & 1, & \ldots, & 1, & -1 \\ 1, & 1, & \ldots, & 1, & 1 \end{pmatrix} W_r \quad (2)$$

where H is a $2^G \times G$ matrix obtained by arranging every possible combination of elements 1 and −1; and (g1d) in the expression given by the above equation (2), converting every element with a value less than 1 into a value 0 while leaving every element with a value 1 unchanged, so as to obtain the energy detection output pattern $F_r$ given by the following equation (3):

$$\frac{1}{G} H W_r \rightarrow [f_1, f_2, \ldots, f_M]_r = F_r. \quad (3)$$

* * * * *